(12) United States Patent
Adriaansen et al.

(10) Patent No.: US 6,700,773 B1
(45) Date of Patent: Mar. 2, 2004

(54) METHOD AND APPARATUS FOR IMPLEMENTING A CONFIGURABLE PERSONAL COMPUTING DEVICE

(75) Inventors: David L. Adriaansen, Boston, MA (US); Richard G. Keiser, New York, NY (US)

(73) Assignee: Revolutionary Learning Systems, Inc., New York, NY (US)

( * ) Notice: Subject to any disclaimer, the term of this patent is extended or adjusted under 35 U.S.C. 154(b) by 71 days.

(21) Appl. No.: 09/705,511

(22) Filed: Nov. 3, 2000

(51) Int. Cl.$^7$ ................................................. G06F 1/16
(52) U.S. Cl. ..................... 361/680; 361/683; 345/156
(58) Field of Search ............................... 361/679–686, 361/724–727; 345/179, 156, 168, 173

(56) References Cited

U.S. PATENT DOCUMENTS

| | | | |
|---|---|---|---|
| 4,916,740 A | * | 4/1990 | Noda et al. ................... 345/168 |
| 4,926,010 A | * | 5/1990 | Citron ......................... 345/168 |
| 5,049,862 A | | 9/1991 | Dao et al. ..................... 340/706 |
| 5,206,790 A | | 4/1993 | Thomas et al. ............... 361/380 |
| 5,237,487 A | * | 8/1993 | Dittmer et al. ............... 361/683 |
| 5,241,303 A | | 8/1993 | Register et al. .............. 340/706 |
| 5,264,992 A | | 11/1993 | Hogdahl et al. .............. 367/681 |
| 5,267,123 A | | 11/1993 | Boothroyd et al. .......... 361/680 |
| 5,278,779 A | | 1/1994 | Conway et al. .............. 364/708 |
| 5,287,245 A | | 2/1994 | Lucente et al. .............. 361/680 |
| 5,297,003 A | | 3/1994 | Nomura et al. .............. 361/680 |
| 5,335,142 A | | 8/1994 | Anderson ..................... 361/681 |
| 5,337,212 A | | 8/1994 | Bartlett et al. ............... 361/681 |
| 5,341,154 A | | 8/1994 | Bird ............................. 345/167 |
| 5,375,076 A | | 12/1994 | Goodrich et al. ............ 364/708.1 |
| 5,440,502 A | | 8/1995 | Register ...................... 364/708.1 |
| 5,490,036 A | | 2/1996 | Lin et al. ...................... 361/680 |
| 5,548,478 A | | 8/1996 | Kumar et al. ................ 361/680 |
| 5,594,619 A | | 1/1997 | Miyagawa et al. .......... 361/681 |
| 5,629,832 A | | 5/1997 | Sellers ......................... 361/680 |
| 5,644,338 A | | 7/1997 | Bowen ......................... 345/168 |
| 5,644,469 A | | 7/1997 | Shioya et al. ................ 361/681 |
| 5,687,939 A | | 11/1997 | Moscovitch ................. 248/122.1 |
| 5,739,810 A | * | 4/1998 | Merkel ......................... 345/156 |
| 5,754,169 A | | 5/1998 | Yashiro ........................ 345/173 |
| 5,805,143 A | | 9/1998 | Myers ........................... 345/163 |
| 5,808,862 A | | 9/1998 | Robbins ....................... 361/681 |
| 5,818,425 A | | 10/1998 | Want et al. ................... 345/158 |
| 5,838,302 A | | 11/1998 | Kuriyama et al. ........... 345/173 |
| 5,847,698 A | | 12/1998 | Reavey et al. ............... 345/173 |
| 5,856,822 A | | 1/1999 | Du et al. ...................... 345/145 |
| 5,864,490 A | | 1/1999 | Van Bost ..................... 364/708.1 |
| 5,872,557 A | | 2/1999 | Wiemer et al. .............. 345/156 |
| 5,873,554 A | | 2/1999 | Nobuchi ....................... 248/278.1 |
| 5,877,750 A | | 3/1999 | Hanson ........................ 345/173 |
| 5,900,848 A | | 5/1999 | Haneda et al. ............... 345/1 |
| 5,910,802 A | | 6/1999 | Shields et al. ............... 345/347 |

(List continued on next page.)

*Primary Examiner*—Lisa Lea-Edmonds
(74) *Attorney, Agent, or Firm*—Wolf, Greenfield & Sacks, P.C.

(57) ABSTRACT

A computer and method of operating same. One aspect is a computer configurable between three configurations. In a first, a display and keyboard are accessible to a user. In a second configuration, the display and a keyless interface are accessible. The third configuration is a tablet configuration. In another aspect the keyboard and keyless interface are disposed on opposite sides of a module, and a cable-less connection is provided between the module and a body of the computer housing the processor. A further aspect is a computer comprising a body and a module slidably mountable thereto and including the keyboard and keyless interface on opposite sides. The body includes a slot to slidably receive the module, with the slot having an open end. A further aspect is an adapter, and method of use therefor, for use with a notebook computer. The adapter comprises a body including a mechanical interface for mechanically mounting to the notebook computer; and a keyless interface movably mounted to the body so that the keyless interface can be arranged in at least two configurations relative to the notebook computer.

4 Claims, 17 Drawing Sheets

U.S. PATENT DOCUMENTS

| | | | |
|---|---|---|---|
| 5,912,662 A | 6/1999 | Bunn et al. | 345/179 |
| 5,926,170 A | 7/1999 | Oba | 345/168 |
| 5,926,364 A | 7/1999 | Karidis | 361/381 |
| 5,956,021 A | 9/1999 | Kubota et al. | 345/179 |
| 5,963,199 A | 10/1999 | Kato et al. | 345/179 |
| 5,966,284 A | 10/1999 | Youn et al. | 361/680 |
| 5,995,085 A | 11/1999 | Bowen | 345/173 |
| 6,006,243 A | 12/1999 | Karidis | 708/100 |
| 6,064,373 A | 5/2000 | Ditzik | 345/173 |
| 6,078,407 A | 6/2000 | Ma | 358/474 |
| 6,081,207 A | 6/2000 | Batio | 341/20 |
| 6,091,600 A | 7/2000 | Jeong | 361/680 |
| 6,118,436 A | 9/2000 | Kushita | 345/173 |
| 6,259,597 B1 * | 7/2001 | Anzai et al. | 361/683 |
| 6,262,885 B1 * | 7/2001 | Emma et al. | 361/683 |

* cited by examiner

METHOD AND APPARATUS FOR IMPLEMENTING A CONFIGURABLE PERSONAL COMPUTING DEVICE

FIELD OF THE INVENTION

The present invention is directed to the field of portable computing devices.

BACKGROUND OF THE INVENTION

As portable computers have become more integrated in our daily lives, consumer demand has prompted an evolution towards increased flexibility. One relatively recent adaptation has been the development of alternative modes of data input, such as digitizers, to replace or augment the use of conventional alphanumeric keyboards. Digitizers have been adapted for computing devices to allow for, among other things, handwritten user input.

The advent of the digitizer interface has inspired tablet computing devices, including handheld personal digital assistants (PDAs), which are special purpose devices having limited computing power, and larger and more powerful general purpose tablet computers. PDAs and tablet computers provide the practical benefit of being compact when in use, because the display includes a digitizer (i.e., it is a touchscreen) that serves as the input device for receiving information from the user, so that the tablet has a relatively smaller footprint as compared to computers having a separate display and input device. PDAs and tablet computers typically enable the user to write, draw, and navigate using a pen-like stylus.

While PDAs and tablet computers provide the advantages discussed above, they suffer from certain disadvantages when compared to conventional notebook or laptop computers.

It is an object of the present invention to provide an improved method and apparatus for implementing a configurable personal computing device.

SUMMARY OF THE INVENTION

One illustrative embodiment of the invention is directed to a computer comprising a body, a display mechanically coupled to the body, an alphanumeric keyboard mechanically coupled to the body, and a keyless user interface mechanically coupled to the body. The computer is configurable between a first configuration, a second configuration and a tablet configuration. In the first configuration the display and the alphanumeric keyboard both are accessible to a user and the keyless user interface is arranged in a stacked configuration with at least one of the display and the alphanumeric keyboard. In the second configuration the display and the keyless user interface both are accessible to the user and the alphanumeric keyboard is arranged in a stacked configuration with at least one of the display and the keyless user interface. In the tablet configuration the display is accessible to the user and the display, the keyboard and the keyless user interface are arranged in a stacked configuration.

Another illustrative embodiment of the invention is directed to a method of operating a computer including a display, an alphanumeric keyboard and a keyless user interface. The is method comprises acts of: (A) arranging the computer in a first open configuration with the display and the alphanumeric keyboard accessible to a user and the keyless user interface arranged in a stacked configuration with at least one of the display and the keyboard; (B) entering information into the computer via the keyboard with the computer in the first open configuration; (C) arranging the computer in a second open configuration in which the display and the keyless user interface both are accessible to the user and the alphanumeric keyboard is arranged in a stacked configuration with at least one of the display and the keyless user interface; (D) entering information into the computer via the keyless user interface with the computer in the second open configuration; (E) arranging the computer in a tablet configuration in which the display is accessible to the user and wherein the display, the keyboard and the keyless user interface are arranged in a stacked configuration; and (F) entering information into the computer via the display with the computer in the tablet configuration.

A further illustrative embodiment of the invention is directed to a method of reconfiguring a computer from a first configuration to a second configuration. The computer includes a body, a processor disposed in the body, a display mechanically coupled to the body, and a module that includes an alphanumeric keyboard and a keyless user interface disposed on opposite sides thereof. The first configuration is one in which the display and the alphanumeric keyboard are accessible to a user. The second configuration is one in which the display and the keyless user interface are accessible to the user. The method comprises acts of: (A) electrically disconnecting the keyboard from the processor; (B) reconfiguring the module so that the keyless user interface is accessible to the user; and (C) creating an electrical connection between the keyless user interface and the processor.

Another illustrative embodiment of the invention is directed to a computer, comprising a body including a processor; a display mechanically coupled to the body; a module that is mountable to the body and includes an alphanumeric keyboard and a keyless user interface disposed on opposite sides thereof; and at least one electrical connector to electrically couple the keyboard and the keyless user interface to the processor, wherein the at least one electrical connector includes a cable-less interface between the module and the body.

A further illustrative embodiment of the invention is directed to a computer, comprising: a body including a processor; a display mechanically coupled to the body; and a module that is slidably mountable to the body and includes an alphanumeric keyboard and a keyless user interface disposed on opposite sides thereof. The body includes a slot to slidably receive the module in a first configuration wherein the keyboard is accessible to the user and the keyless user interface is inaccessible and in a second configuration wherein the keyless user interface is accessible to the user and the keyboard is inaccessible, the slot having first and second ends. The second end is open so that the module can be slid partially out of the slot so that a portion of the module can extend beyond the second end when moving between the first and second configurations.

Another illustrative embodiment of the invention is directed to an adapter for use with a notebook computer. The adapter comprises a body including a mechanical interface for mechanically mounting the body to the notebook computer; and a keyless user interface that is movably mounted to the body so that the keyless user interface can be arranged in at least two configurations relative to the notebook computer.

Yet another illustrative embodiment of the invention is directed to a method of operating a notebook computer including a display and a keyboard. The method comprises acts of: (A) providing an adapter having a keyless user interface movably mounted thereto; (B) mechanically coupling the adapter to the notebook computer; (C) arranging the adapter and the notebook computer in a first configuration with the keyless user interface overlying the keyboard of the notebook computer so that the keyless user interface and the display are accessible; (D) entering information into the notebook computer via the keyless user interface with the adapter and the notebook computer in the first configuration; (E) arranging the adapter and the notebook computer in a second configuration with the keyless user interface underlying the notebook computer so that the keyboard and the display are accessible; and (F) entering information into the notebook computer via the keyboard with the adapter and the notebook computer in the second configuration.

DETAILED DESCRIPTION

Figure 1:
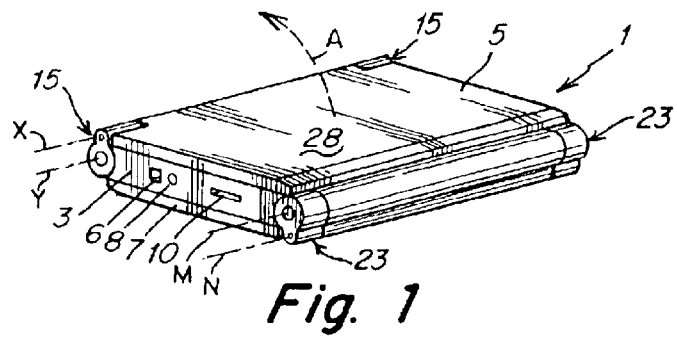
FIG. 1 is a perspective view of a computer according to one illustrative embodiment of the invention in which the computer is in a closed configuration.

As mentioned above, while PDAs and tablet computers provide advantages in terms of their compact size and ability to accept user input via a digitizer capable of working with a stylus or the user's finger, they also suffer significant disadvantages. For example, to meet the size limitations that are inherent to PDAs and tablet computers, the conventional integrated alphanumeric keyboard has been sacrificed. For certain types of user input (e.g., written text or numerical data), an alphanumeric keyboard is a significantly more efficient interface than the digitizer provided in a PDA or tablet computer. In addition, because the digitizer in a conventional PDA or tablet computer is integrated into the display screen, the user does not have the option of entering input on a device that is separate from the display, which limits the flexibility that the user has when inputting information, and the user's hand obscures a portion of the display when writing on the display.

In view of the foregoing, one embodiment of the present invention is directed to a computer that is configurable between different modes to enable the computer to combine the advantages of a standard notebook computer with those of a tablet computer. In one embodiment, the computer includes a display, an alphanumeric keyboard and a keyless user interface (e.g., a digitizer), and is configurable between several different configurations. In the specific embodiments discussed below, the keyless user interface is referred to as a digitizer. However, it should be appreciated that the present invention is not limited in this respect, as other types of keyless user interfaces (e.g., scanners) can be employed in any of the embodiments discussed below.

In a first mode, the computer is in an open configuration that corresponds to a typical open configuration for a notebook computer, wherein the display and the alphanumeric keyboard are accessible to the user. This configuration enables the user to input information into the computer using the keyboard, and to receive visual feedback from the computer via the display. When in this configuration, the computer can be used in any of the ways that conventional notebook computers are employed. In addition, the display may be a touchscreen that enables the user to enter data directly thereon, giving the user the further option of entering information through the display.

In a second mode, the computer is in an open configuration wherein the display and the keyless input device (e.g., the digitizer) are both accessible to the user, while the keyboard is disposed under the keyless input device or is otherwise inaccessible. The user can enter data via the keyless input device and receive visual feedback from the computer via the display. The display and the input device can be arranged in a side-by-side arrangement or any other arrangement that the user finds convenient. In the embodiment of the invention wherein the display is a touchscreen, the user has the option of also entering information directly on the touchscreen.

In a third mode, the computer is in a tablet configuration wherein the display is exposed and accessible for data input, while the other keyless user interface and keyboard are disposed under the display or otherwise arranged in a stacked configuration so as to not increase the footprint of the computer significantly beyond that of the display. As mentioned above, to support the ability of the computer to be placed in the tablet configuration, the display screen can be a touchscreen that not only serves as an output device providing visual feedback to the user, but also serves as an input and pointing device. It should be appreciated that when in the tablet configuration, the computer has a smaller overall footprint than when in either of the other two open configurations, thereby providing the user with the advantages of conventional tablet computers.

Finally, in some embodiments of the invention, the computer also can be configured in a closed configuration in which the display, the keyless user interface, and the keyboard (collectively referred to as "interface devices" below) are enclosed and/or protected by the computer chassis or covers, so that they are not accessible to the user without reconfiguring (e.g., opening) the computer. The closed configuration provides a convenient configuration for transport, as the interface devices are protected from damage they might incur if exposed. However, it should be appreciated that the present invention is not limited to computers that have a closed configuration, as the computer can be stored or transported in other modes (e.g., the tablet configuration) with one or more of the interface devices exposed.

It should be appreciated that the above-described embodiment of the invention, wherein a computer having a display, keyboard and keyless user interface integrated therein is configurable between at least three different operational configurations, provides an advantage over conventional computing devices, as it provides a level of flexibility not possible with conventional computers. For example, no conventional computer has these three interface devices integrated therein and is configurable in the above-discussed three operable configurations. As used herein, reference to the interface devices being integrated into the computer refers to the devices being mechanically coupled thereto in an assembled manner, which is to be distinguished from a computer that can be used with peripheral devices that may be electrically coupled to the computer via an input/output port, but that are not mechanically coupled thereto in any fixed or permanent manner. This aspect of the present invention is not limited to any particular technique for interconnecting the interface devices to achieve the desired range of flexibility in system configuration, as numerous implementation techniques are possible. Thus, although numerous implementations are described below, it should be appreciated that these are provided merely for illustrative purposes, as the present invention is not limited to these specific implementations.

A first illustrative implementation of a configurable computer capable of achieving all of the configurations discussed above is shown in FIGS. 1–9. The computer 1 includes three sections, i.e., a main body 3, panel 5 that is rotatably mounted to the main body 3 via a pair of double hinge arrangements 15, and a panel 7 that is rotatably mounted to the main body 3 via a pair of double hinge arrangements 23. As shown in the cross-sectional view of FIG. 9 (taken along line 9—9 in FIG. 2), the main body 3 houses the processor 9 of the computer 1 and has a full alphanumeric keyboard 11 fixedly mounted thereto. The keyboard 11 is electrically connected to the processor 9 via a cable 12. The cable 12 (both for the embodiment of FIGS. 1–9 and all those discussed below) may be any type of cable suitable for electrically coupling the processor 9 to the keyboard 11. The present invention (both for the embodiment of FIGS. 1–9 and each of the embodiments) is not limited to employing any particular type of processor 9, as any suitable processor can be used, and may have sufficient processing power and software support (e.g., an operating system capable of allowing multiple processes to execute simultaneously) to enable the computer to function as a general purpose computer.

In the embodiment shown in FIGS. 1–9, the keyboard 11 is a full alphanumeric keyboard, including all of the letters in the alphabet and all numerical digits, and is a standard notebook size mechanical keyboard adapted to work with the user's fingers. However, it should be appreciated that the present invention is not limited in this respect, as other forms of keyboards can alternatively be used, either with the embodiment of FIGS. 1–9, or with any of the other embodiments described below. In addition, in the embodiment shown in FIGS. 1–9, the main body 3 also includes a small touchpad and mouse button assembly 4 (see FIG. 2) that is disposed on the same panel and adjacent to the keyboard 11 and can be used as a pointing device (e.g., for cursor control), as with many conventional notebook computers. Again, it should be appreciated that the present invention is not limited in this respect, as different types of keyless input devices can also be provided on or near the keyboard, or they can be eliminated entirely, as the present invention (for the embodiment of FIGS. 1–9 and each of those below) is not limited to any particular configuration in this respect.

The main body 3 of the computer may be provided with any number of connectors and/or adapters 6 and 8 to enable various types of peripheral devices to be attached to the computer, including various types of external drives, input or output devices, and power and communications connections. The computer may also be provided with one or more disk drives, each having an opening 10 for loading a disk into the computer, and/or one or more CD drives. Of course, it should be appreciated, that neither this embodiment of the present invention nor any of the other embodiments discussed below is limited to use with any specific types of connectors, adapters, peripheral interfaces, or storage devices, as numerous options are possible.

The panel 5 includes a display 13 which can take any of numerous forms, as neither the embodiment of FIGS. 1–9 nor any of the other embodiments described below is limited to using any particular type of display, so that any type of display suitable for use in a portable computer can be employed. As mentioned above, the display may be a touchscreen that enables the user to enter data thereon. For the embodiment of FIGS. 1–9 and those discussed below, any suitable type of touchscreen can be employed, such as those that are responsive to mechanical stimuli such as from a finger and/or a stylus, or to electrical stimuli from a finger or stylus to enter information or to select or highlight information displayed on the screen. As shown in the cross-sectional view of FIG. 9, a cable 17, passing through double hinge arrangement 15, can be provided to electrically connect the processor 9 to the display 13, and can be any suitable type of cable.

The panel 7 houses a keyless user interface, which as discussed above can be either a digitizer 19 or other type of interface. As used herein, a keyless user interface refers to an interface that may function without keys. However, it should be appreciated that a keyless user interface may have associated keys or buttons, disposed on the same surface of panel 7 or elsewhere, for the purpose of added functionality (e.g., an on/off button). In one embodiment, such additional keys or buttons associated with the keyless user interface do not form a full-size, mechanical alphanumeric keyboard, such that the keyless user interface does not share a panel surface with a full-size, mechanical alphanumeric keyboard. As shown in the cross-sectional view of FIG. 9, a cable 25, passing through double hinge arrangement 23, can be provided to electrically connect the processor 9 to the digitizer 19. In FIGS. 1–9, the digitizer 19 is of substantially the same size as the keyboard 11, and is adapted to cooperate with a stylus 21 (FIGS. 3 and 7) for entering data thereon. In another embodiment of the invention, the digitizer 19 occupies a greater surface area than the alphanumeric keyboard 11. However, it should be appreciated that none of the embodiments of the present invention is limited to using a keyless user interface of any particular size or shape. In addition, for those embodiments wherein the keyless user interface is a digitizer, the digitizer is not limited to one that works with a stylus, as the digitizer may be a touchscreen, and may be responsive to mechanical, electrical, or any other suitable mode of stimulus. In addition, the digitizer (for the embodiment of FIGS. 1–9 and each of the embodiments discussed below) may be of the type capable of working with a paper overlay so that the user can write on paper while entering information into the digitizer, and/or may also be a display capable of providing visual feedback to the user of the information being entered. In the embodiment shown, the panel 7 includes a set of four feet 22 (see FIG. 8), each located in one corner of the panel on the side where the digitizer 19 is exposed. These feet 22 serve to protect the digitizer 19 from damage when the computer is in the tablet configuration of FIGS. 4 and 8, and the digitizer side of the panel is placed in contact with a surface. However, it should be appreciated that the invention is not limited to using such feet 22.

While not shown in the figures, the computer 1 can include a power source, such as a battery, to provide power to the electrical components of the system, and to enable the computer to be used in a portable mode in which it is not connected to an electrical outlet or other external power source.

The double hinge arrangements 15 and 23 are adapted to provide substantially 360° of rotation for the panels 5 and 7, respectively, about the main body 3, so that each of the panels can overlie and underlie the main body 3. For example, the panel 5 overlies the main body 3 in the closed configuration of FIGS. 1 and 5, and "underlies" (or would if the whole computer were not flipped over) the main body 3 in the tablet configuration of FIGS. 4 and 8. Similarly, the panel 7 underlies the main body 3 in the notebook configuration of FIGS. 2 and 6 and the closed configuration of FIGS. 1 and 5, overlies the main body 3 in the configuration of FIGS. 3 and 7, and would overlie (if the whole computer were not flipped over) the main body 3 in the tablet configuration of FIGS. 4 and 8. It should be appreciated that for the panels 5 and 7, when each is at the full extent of rotation around its double hinge arrangement, a surface of the panel lies adjacent to the main body 3 and is inaccessible to the user, with a different surface of each of the panels being inaccessible when it overlies or underlies the main body 3.

Each double hinge arrangement includes a pair of smaller hinges 15a, 23a (see FIGS. 5–9) that rotate about axes X and N, respectively, and a pair of larger hinges 15b, 23b that rotate about axes Y and M, respectively. The panels 5 and 7 are mounted to the smaller hinges 15a, 23a, which in turn are mounted to the larger hinges 15b, 23b, respectively. Larger hinges 15b and 23b have a rotational range of approximately 180°, so that the smaller hinges 15a and 23a, and consequently the panels 5 and 7, can be moved between top 3T and bottom 3B surfaces of the main body 3. As used herein the "top" surface of the main body 3 is the surface 3T on which the keyboard 11 is disposed, and the "bottom" surface is the opposite surface 3B, irrespective of the orientation of the main body (e.g., the top surface is disposed below the bottom in the tablet configuration of FIGS. 4 and 8). When the larger hinges 15b are pointing toward the top surface 3T of the main body 3, the smaller hinges 15a (and the panel 5 mounted thereto) are disposed adjacent the top 3T of the main body, whereas when larger hinges 15b point toward the bottom 3B of the main body 3, the smaller hinges and panel 3 are disposed adjacent the bottom 3B.

The smaller hinges 15a and 23a provide a range of adjustability for their corresponding panels 5 and 7 relative to the top or bottom surface of the main body 3. In one embodiment, the range of motion of each of the smaller hinges 15a, 23a is equal to at least 180° so that each of the panels can be disposed adjacent and essentially parallel to both the top 3T and bottom 3B surfaces of the main body 3. For example, the smaller hinge 15a enables the panel 5 to be oriented parallel to the top 3T of the main body in the closed configuration of FIGS. 1 and 5, and parallel to the bottom 3B of the main body in the tablet configuration of FIGS. 4 and 8. Providing at least 180° of rotation of the panel 5 also enables the display to be oriented in any convenient position relative to the keyboard 11 (FIG. 6) or the digitizer (FIG. 7) in the open configurations discussed below.

In one embodiment, a stop optionally may be employed to limit relative rotation between the smaller hinges 15a, 23a and their corresponding larger hinges 15b, 23b. Such stops can enable a user to move only the panels 5 and 7 relative to the main body, and can cause the larger hinges 15b, 23b to automatically begin rotating after the full limit of rotation has been achieved about the smaller hinges 15a, 23a. Such stops can be provided at any suitable rotational range (e.g., 180°), and can be implemented in any suitable way. Of course, it should be appreciated that stops are not necessary, and need not be provided.

It should be appreciated that the present invention is not limited to employing the specific hinge assemblies shown and described in connection with FIGS. 1–9. For example, other embodiments of the present invention achieve the same functionality and range of motion with an arm hinge assembly (see e.g., FIGS. 49–52) and a living hinge (see e.g., FIGS. 53–55). In addition, rather than employing a pair of hinge assemblies at opposite ends of the panels, any number of hinges can be employed including a single hinge, which might be centered and run, instead, along a longer distance. Each of the hinge arrangements is provided merely for illustrative purposes, as other types of suitable hinges can be employed in the embodiment of FIGS. 1–9, as well as each of the other embodiments described below.

Figure 3:
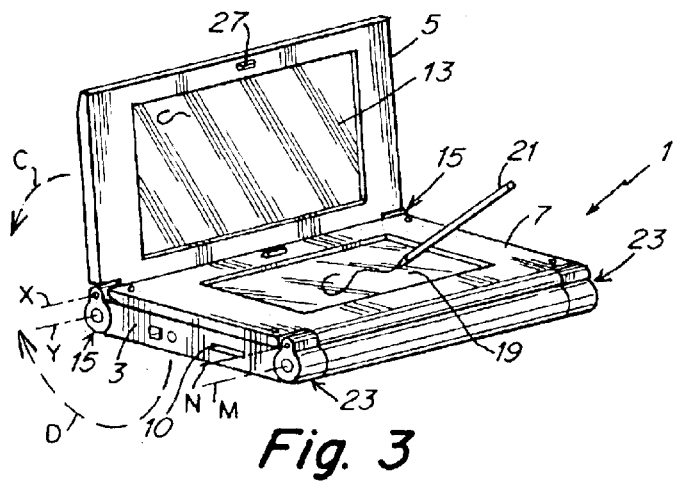
FIG. 3 is a perspective view of the computer of FIGS. 1–2 in an open dual-digitizer configuration.
Figure 4:
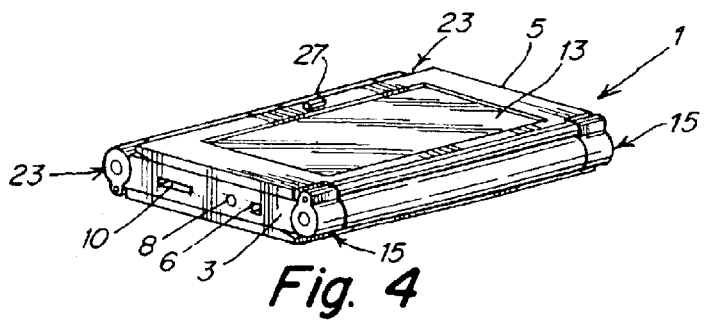
FIG. 4 is a perspective view of the computer of FIGS. 1–3 in a tablet configuration.
Figure 5:
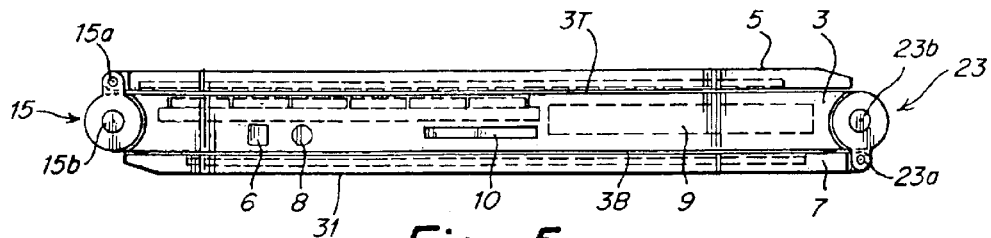
FIG. 5 is a side view of the computer of FIGS. 1–4 in the closed configuration corresponding to FIG. 1.

The embodiment of FIGS. 1–9 is configurable in any of four configurations. A first configuration is shown in FIGS. 1 and 5 and is essentially a closed configuration, wherein neither the display 13, the keyboard 11, nor the digitizer 19 is accessible to the user. As used herein, any one of these components is considered to be "inaccessible" if the component cannot be used as intended without reconfiguring the computer into a different configuration, as the computer is capable of being reconfigured into other configurations as discussed below to make each of these components accessible. In the closed configuration, the panel 5 is disposed adjacent the top 3T of the main body 3, with the surface on which the display 13 is mounted facing in toward the main body 3 so that the display 13 is protected by a housing or cover 28. Similarly, the panel 7 is disposed adjacent the bottom 3B of the main body, with the digitizer 19 facing in toward the main body 3 so that the digitizer is protected by a housing or cover 31. In the embodiment shown, the panel 5 and the main body 3 include a pair of mating features 27 and 29 that mate to lock the computer in the closed configuration of FIG. 1. In the particular embodiment shown in FIG. 2, the panel 5 includes a male feature 27 and the main body 3 includes a female feature 29 to receive it. However, it should be appreciated that the present invention is not limited in this respect, as any mechanism suitable for retaining the computer in the closed configuration can be used. Similarly, in the embodiment shown, the panel 7 and the main body 3 also include a pair of mating features 33 and 30 (FIG. 9) to lock the panel 7 to the main body 3. In the particular embodiment shown in FIG. 9, the panel 7 includes a male feature 33 and the main body 3 includes a female feature 30 to receive it, but the present invention is not limited in this respect, as any mechanism suitable for retaining the panel 7 to the main body 7 can be used. Furthermore, it should be appreciated that the present invention is not limited to employing any features at all for locking the panels and 5 and 7 to the main body 3.

Figure 2:
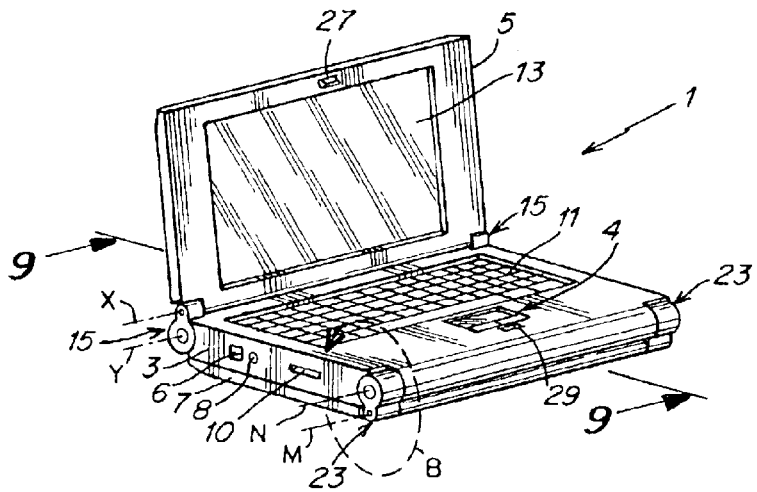
FIG. 2 is a perspective view of the computer of FIG. 1 in an open notebook configuration.
Figure 6:
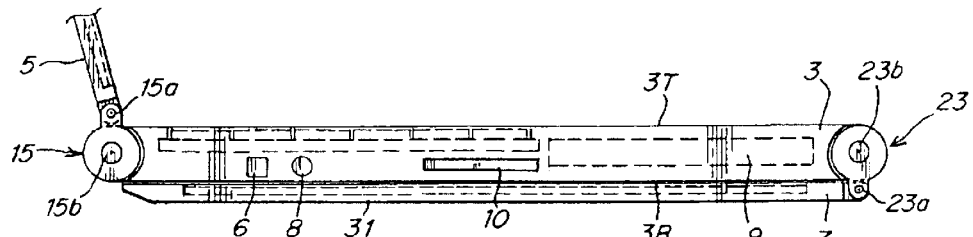
FIG. 6 is a side view of the computer of FIGS. 1–5 in the open notebook configuration corresponding to FIG. 2.

A second configuration is shown in FIGS. 2 and 6, and corresponds to a typical open configuration for a notebook computer, wherein the display 13 and keyboard 11 are accessible to the user. The digitizer 19 is disposed adjacent the bottom 3B of the main body 3 and is inaccessible. The computer 1 is reconfigured from the closed configuration of FIG. 1 to the open notebook configuration of FIG. 2 by simply rotating the panel 5 about the axis X in the direction of the arrow A shown in FIG. 1.

Figure 7:
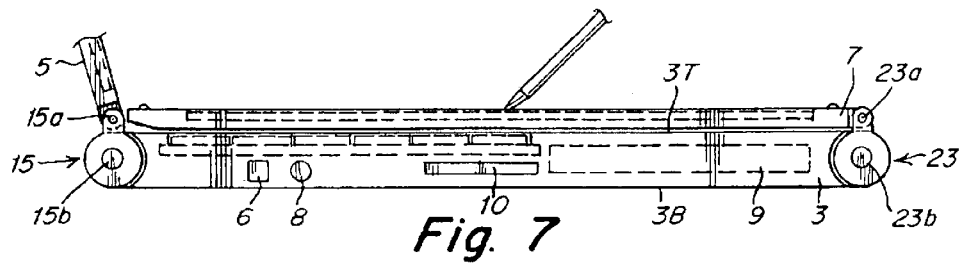
FIG. 7 is a side view of the computer of FIGS. 1–6 in the dual-digitizer configuration corresponding to FIG. 3.

A third configuration is shown in FIGS. 3 and 7, and is one wherein the display 13 and digitizer 19 both are accessible to the user. In this configuration, the user may enter data onto the digitizer 19, for example using a stylus 21 as shown in FIG. 3. The display 13 can be adjusted about the axis X to a side-by-side arrangement coplanar with the digitizer 19, or to any other convenient position. In the embodiment of the present invention wherein the display 13 is a touchscreen, this mode of operation provides two full-size digitizers (e.g., approximately the same size as a standard alphanumeric keyboard) that enable the user to input data into the computer 1. The configuration described above is referred to herein as a dual-digitizer configuration, because in one embodiment of the invention the display and the keyless user interface both include digitizers. However, it should be appreciated that either of the display and the keyless user interface need not include a digitizer. Nevertheless, the phrase dual-digitizer configuration is used herein for convenience sake to refer to the configuration wherein the display and the keyless user interface both are accessible, and is not intended to limit either of those interface devices to include a digitizer. The computer 1 is moved from the open notebook configuration of FIG. 2 to the open dual-digitizer configuration of FIG. 3 by rotating the panel 7 about both of the axes M and N in the direction of the arrow B as shown in FIG. 2. Thus, the double hinge arrangement 23 is employed to rotate the panel 7 up so that it is in the plane of the top 3T of the main body 3, and to further flip the panel 5 down so that it sits atop the main body 3 with the digitizer 19 facing away from the main body so that is accessible to the user. The panel 7 is disposed adjacent the top 3T of the main body 3, rendering the keyboard 11 inaccessible to the user.

Figure 8:
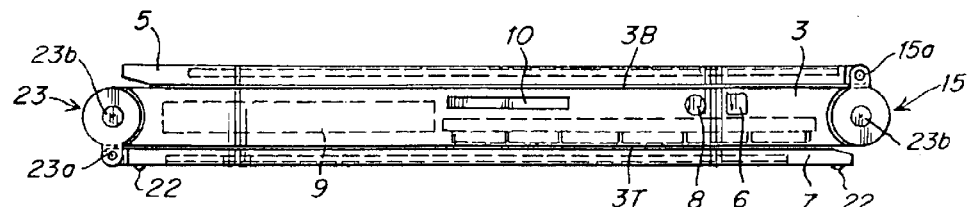
FIG. 8 is a side view of the computer of FIGS. 1–7 in a tablet configuration corresponding to FIG. 4.
Figure 9:
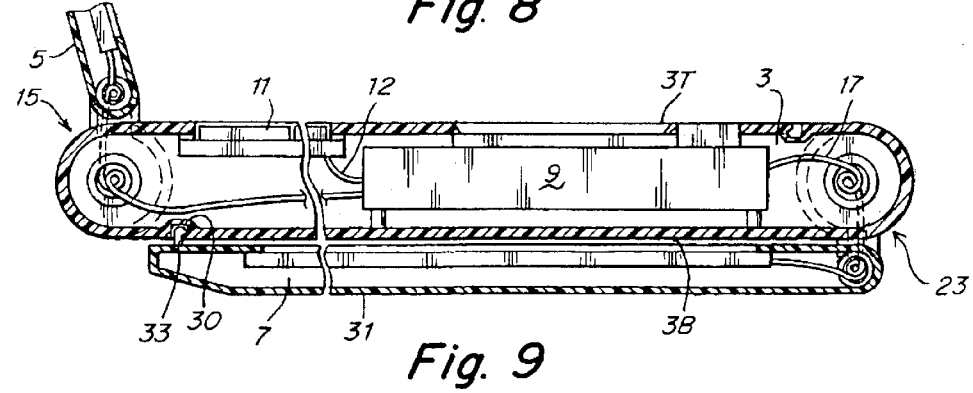
FIG. 9 is a cross-sectional view, taken along line 9—9 of FIG. 2, of the computer of FIGS. 1–8.

The fourth and final configuration is shown in FIGS. 4 and 8, and is a tablet configuration, wherein the panels 5 and 7 and the main body 3 overlie one another in a stacked arrangement that minimizes the footprint of the computer, and in which the display 13 is accessible to the user. This mode is particularly useful when the display is capable of acting as an input/output device enabling user input as with conventional tablet computers. In one embodiment, this is achieved by employing a touchscreen as the display. Alternatively, a display may be employed with associated buttons or controls to allow for data input. The computer 1 is moved from the open dual-digitizer configuration of FIGS. 3 and 7 into the tablet configuration of FIGS. 4 and 8 by rotating the panel 5 in the direction of arrow C in FIG. 3, and/or rotating the main body 3 in the direction of arrow D shown in FIG. 3, such that there is relative rotation between the panel 5 and the main body 3 about both of 5 axes X and Y, until the panel 5 is disposed back-to-back with the bottom 3B of the main body. The computer 1 can then be flipped over so that the display is accessible to the user.

Figure 10:
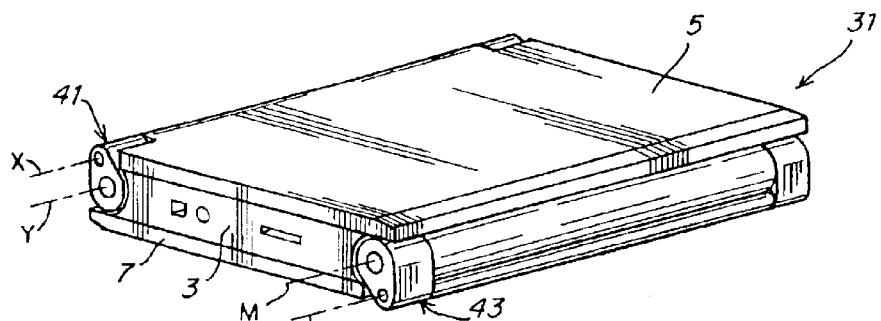
FIG. 10 is a perspective view of a computer according to an alternate embodiment of the present invention and in a closed configuration.
Figure 11:
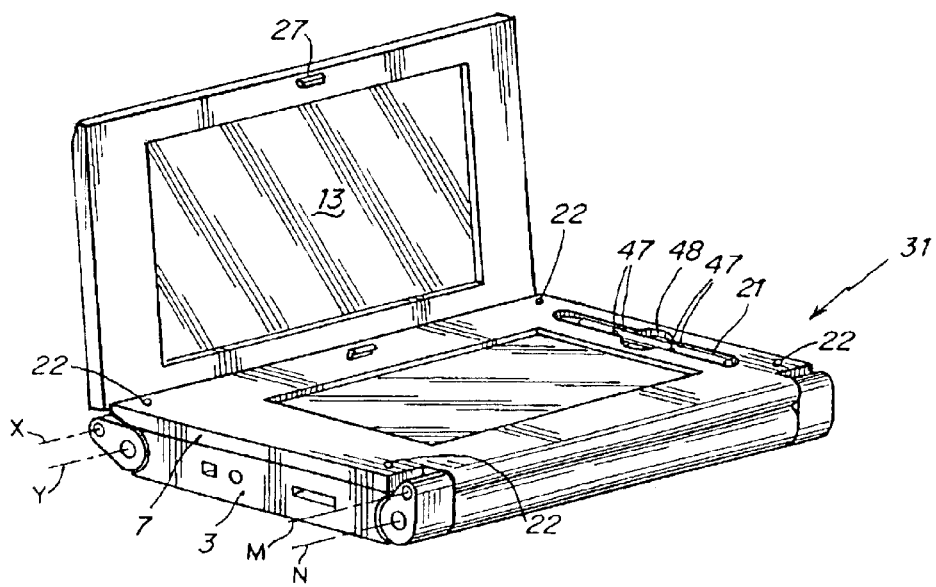
FIG. 11 is a perspective view of the computer of FIG. 10 in an open dual-digitizer configuration.
Figure 12:
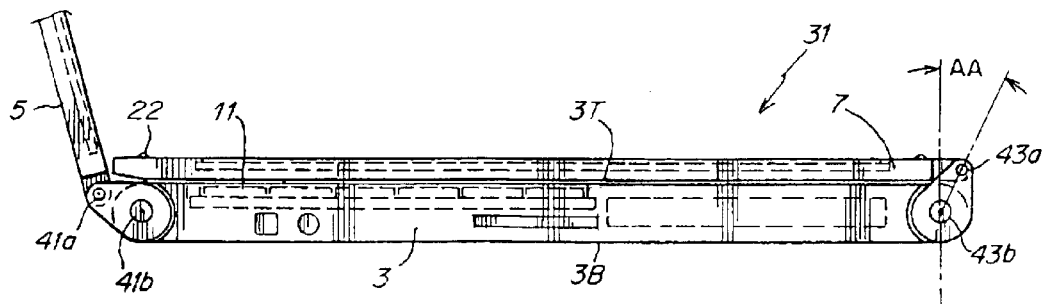
FIG. 12 is a side view of the computer of FIGS. 10–11 in the open dual-digitizer configuration corresponding to FIG. 11.

An alternate embodiment of the invention is shown in FIGS. 10–12. This embodiment is substantially similar to the embodiment of FIGS. 1–9, except that a slightly different double hinge arrangement is employed to allow for larger panels for housing the display and digitizer.

In the embodiment of FIGS. 10–11, slightly different double hinge arrangements 41 and 43 are employed for rotatably mounting the panels 5 and 7, respectively, to the main body 3. As best shown in FIG. 12, the double hinge arrangement 41 includes a smaller hinge 41a and a larger hinge 41b, and the double hinge arrangement 43 includes a smaller hinge 43a and a larger hinge 43b, in a manner similar to the double hinge arrangements 15 and 23 discussed above in connection with the embodiment of FIGS. 1–9. However, the larger hinges 41b, 43b rotate through a range of motion less that 180°, such that at the limits of their rotation, the larger hinges do not point in a direction perpendicular to the top 3T and bottom 3B surfaces of the main body 3. Rather, as shown in FIG. 12, at its full limit of rotation the larger hinge 43b is disposed at an angle AA relative to a line perpendicular to the top 3T and bottom 3B of the main body. Although not shown in its fully rotated position in FIG. 12, the larger hinge 41b is disposed at a similar angle. As a result, slightly longer panels 5 and 7 can be employed as compared with the embodiment of FIGS. 1–9. Thus, although the same reference characters are used in FIGS. 10–12 to refer to the panels 5 and 7, it should be appreciated that these panels can be slightly larger than in the embodiment of FIGS. 1–9, which may be advantageous in that a larger surface area can be provided for the interface devices.

It should be appreciated that the embodiment of FIGS. 10–12 is configurable in any of the same four configurations discussed above in connection with the embodiment of FIGS. 1–9, and can be moved from one configuration to the other in substantially the same way.

In the embodiment of the invention shown in FIG. 11, the panel 7 is provided with a feature 48 for receiving the stylus 21, so that the stylus can be conveniently stored with the computer 31. In the particular embodiment shown, the feature 48 is a recess having a set of nodes 47 that allows a press fit of the stylus 21 to secure the stylus therein. However, it should be appreciated that numerous other types of features for attaching the stylus to the computer 31 can be employed, such that this aspect of the present invention is not limited to employing a recess, nor to mounting the feature on the same panel 7 that houses the digitizer 19. Furthermore, while the feature 48 is not shown in connection with the embodiment of FIGS. 1–9, nor other of the embodiments described below, it should be appreciated that each of the embodiments of the present invention described herein optionally can be provided with a feature for securing a stylus.

Another embodiment of the present invention is shown in FIGS. 13–20. In this embodiment, the computer 49 includes a main body 51 and a panel 53 movably mounted to the main body 51 via an arrangement of hinged arms. The main body 51 houses both a digitizer 57 and a keyboard 55, fixedly mounted on opposite faces of the main body 51. In the embodiment shown, the digitizer 57 is of substantially the same size as the keyboard 55 and is adapted to cooperate with a stylus 21 for entering data thereon. Of course, as with the embodiments discussed above, other types of digitizers or keyless user interfaces alternatively can be employed. As shown in the fragmentary cross-sectional view of FIG. 20 (which is taken along line 20—20 of FIG. 18), the main body 51 also houses the processor 9. The keyboard 55 is electrically connected to the processor 9 by a cable 59, which can be any type of suitable cable. The digitizer 57 also can be electrically connected to the processor 9 by a cable (not shown).

The panel 53 includes a display 61 fixedly mounted thereto. As shown in the fragmentary cross-sectional view of FIG. 20, a cable 69 can be provided to electrically connect the processor 9 to the display 61.

As mentioned above, the panel 53 is mounted to the main body 51 via an arrangement of hinged arms. A first pair of arms 62 is provided as part of a U-shaped support that includes a support member 64 extending between the arms 62. The main body 51 is pivotally mounted (about an axis S) to the arms 62 at a location spaced from the support member 64. Similarly, the panel 53 is pivotally mounted (about an axis Q) at one end of a second pair of arms 65, with the second pair of arms 65 in turn being pivotally mounted (about an axis R) at the other end to the arms 62.

Figure 13:
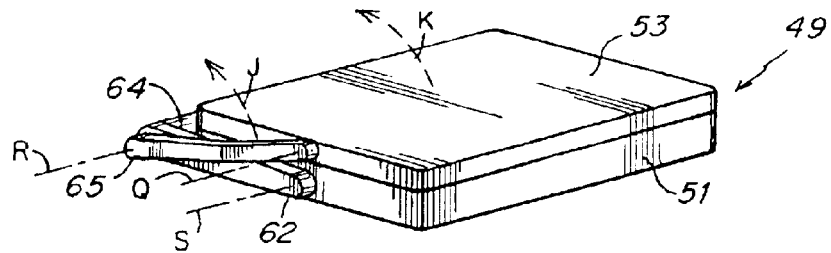
FIG. 13 is a perspective view of a computer according to an alternate embodiment of the present invention and in a closed configuration.
Figure 15:
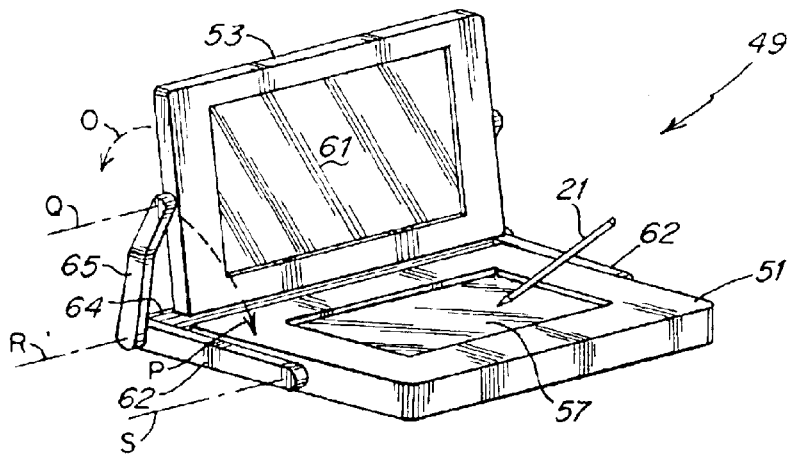
FIG. 15 is a perspective view of the computer of FIGS. 13–14 in an open dual-digitizer configuration.
Figure 16:
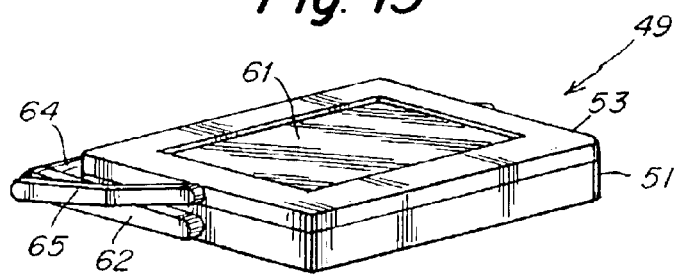
FIG. 16 is a perspective view of the computer of FIGS. 13–15 in a tablet configuration.
Figure 17:
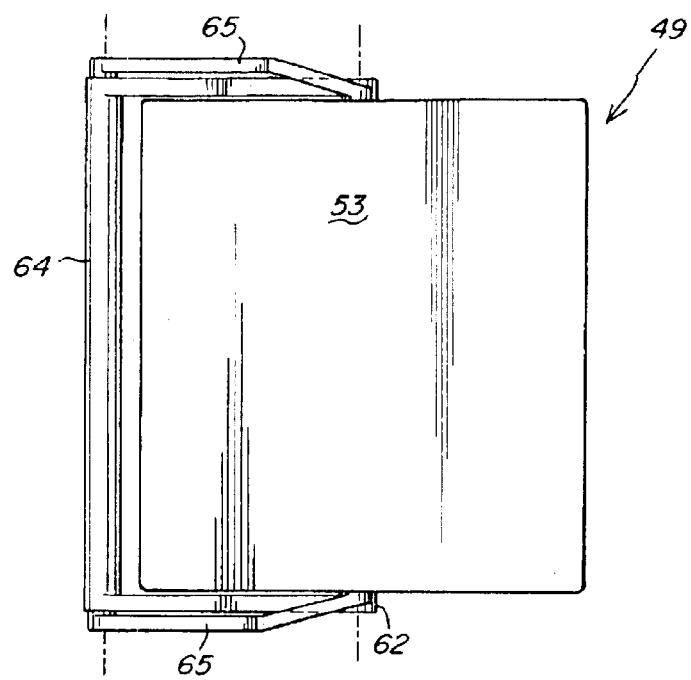
FIG. 17 is a top view of the computer of FIGS. 13–16 in the closed configuration corresponding to FIG. 13.
Figure 18:
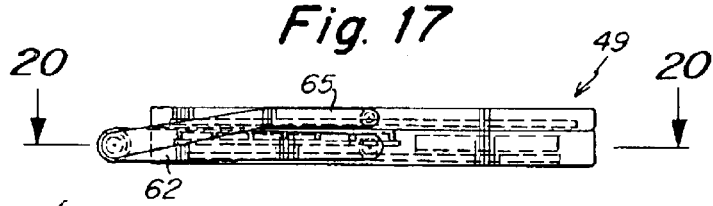
FIG. 18 is a side view of the computer of FIGS. 13–17 in the closed configuration corresponding to FIGS. 13 and 17.
Figure 19:
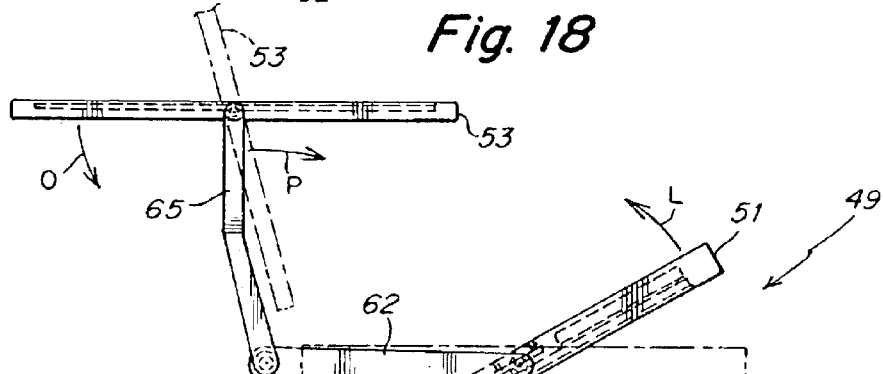
FIG. 19 is a side view of the computer of FIGS. 13–18 showing how various components are moveable to facilitate reconfiguration of the computer.
Figure 20:
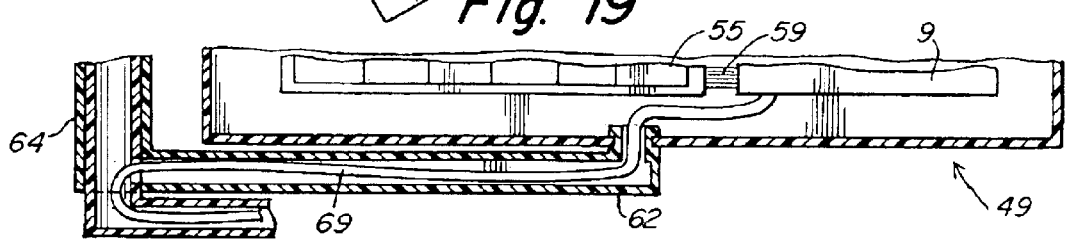
FIG. 20 is a cross-sectional view, taken along line 20—20 of FIG. 18, of the computer of FIGS. 13–19.

The embodiment of FIGS. 13–20 is configurable in any of the four configurations discussed above in connection with the embodiments of FIGS. 1–12. FIG. 13 illustrates the closed configuration wherein none of the display 61, keyboard 55 or digitizer 57 is accessible to the user. Top and side views of the closed configuration are shown in FIGS. 17 and 18, respectively.

Figure 14:
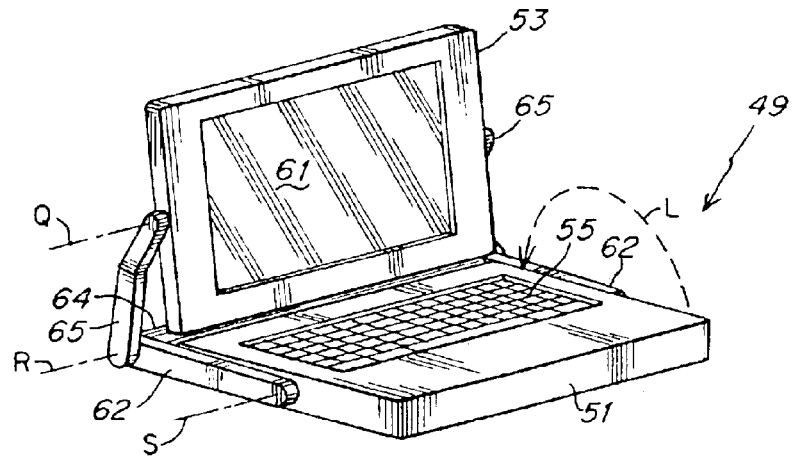
FIG. 14 is a perspective view of the computer of FIG. 13 in an open notebook configuration.

FIG. 14 illustrates the open configuration corresponding to a typical open configuration for a notebook computer, wherein the display 61 and keyboard 55 are accessible to the user. The computer is reconfigured from the closed configuration of FIG. 13 to the open configuration of FIG. 14 by rotating the arms 65 (about the axis R) relative to the arms 62 in the direction of the arrow J in FIG. 13, and by rotating the panel 53 (about axis Q) relative to the arms 62 in the direction of the arrow K in FIG. 13.

FIG. 15 illustrates the dual-digitizer configuration wherein the display 61 and digitizer 57 (or other type of keyless user interface) both are accessible to the user. As with the embodiments discussed above, in this configuration the user can enter information on the digitizer 57, and when the display 61 is a touchscreen, this configuration provides two full size digitizers to receive user input. The computer is moved from the open notebook configuration of FIG. 14 to the open dual-digitizer configuration of FIG. 15 by rotating the main body 51 (about the axis S) relative to the arms 62 by approximately 180°, as indicated by the arrow L in FIGS. 14 and 19.

Finally, the tablet configuration is shown in FIG. 16, and is one wherein the display 61 is disposed back-to-back with the main body 51 so that the display 61 is accessible, and the panel 53 and main body 51 are arranged in a stacked configuration that minimizes the footprint of the computer. The computer is moved from the open dual-digitizer configuration of FIG. 15 to the tablet configuration of FIG. 16 by rotating the panel 53 (about axis Q) relative to the arms 65 in the direction of the arrow O in FIGS. 15 and 19, and by rotating the arms 65 (about axis R) toward the arms 62 in the direction of arrow P in FIGS. 15 and 19. In this manner, the panel 53 is rotated so that it is parallel with the main body 51, and the arms 62 and 65 are moved together so that the panel 53 sits atop the main body 51.

Another embodiment of the present invention is illustrated in FIGS. 21–28. In this embodiment, the computer 105 is capable of being configured in any of the configurations discussed above in connection with the other embodiments of the invention. The computer 105 includes a main body 107, a first panel 109 rotatably mounted thereto, and a second panel 110 that is also rotatably mounted thereto. While not shown in the drawings, the main body 107 houses the processor for the computer 105, as well as cables for connecting the processor to the interface devices in much the same manner as with the embodiments discussed above. In addition, a digitizer 113 (or other keyless user interface) is fixedly mounted to the main body 107.

The panel 109 includes a display 115 fixedly mounted thereto. The panel 109 is rotatably mounted to the main body 107 to enable the panel 109 to move freely from a closed configuration wherein the display is disposed adjacent a top 107T (FIG. 22) of the main body, or can be disposed back-to-back against the bottom 107B (FIG. 24) of the main body to place the computer 105 into a tablet configuration, in much the same manner as the embodiments discussed above. In the embodiment shown, the panel 107 is mounted to the main body 107 via a double hinge arrangement 117, which can be implemented in much the same manner as the embodiments of FIGS. 1–12. However, it should be appreciated that the embodiment of the present invention shown in FIGS. 21–28 is not limited to using any specific type of arrangement for mounting the panel 109 to the main body 107, as numerous other techniques are possible that can provide the desired degree of configurability.

The panel 110 has a keyboard 111 fixedly mounted thereto. In one embodiment of the present invention, the keyboard 111 is a full alphanumeric keyboard. However, as with the embodiments described above, this embodiment of the present invention is not limited in this respect, as other types of keyboards can be employed.

Figure 22:
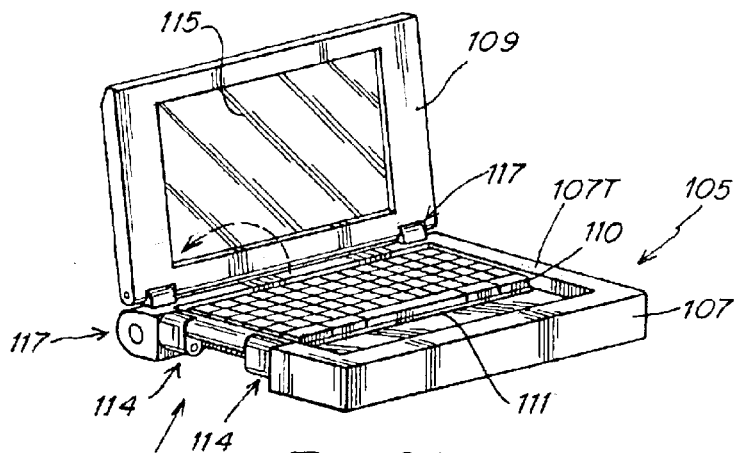
FIG. 22 is a perspective top view of the computer of FIG. 21 in an open notebook configuration.
Figure 23:
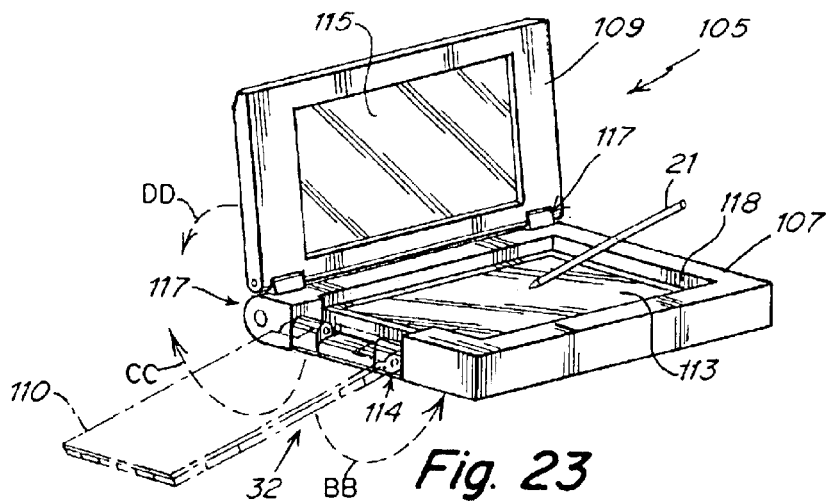
FIG. 23 is a perspective top view of the computer of FIGS. 21–22 in an open dual-digitizer configuration.

As best shown in FIGS. 22 and 23, the panel 110 is rotatably mountable to the main body 107, so that the keyboard 111 can be rotated into a use position atop the main body 107, or can be rotated to a non-use position underneath the main body 107. In the embodiment shown in the figures, this degree of rotation is achieved through the use of a pair of double hinge arrangements 114 that work in much the same manner as the double hinge arrangements 15, 23 discussed above in connection with the embodiment of FIGS. 1–9. However, it should be appreciated that this embodiment of the present invention is not limited in this respect, as numerous other techniques (e.g., a living hinge, arm arrangement, etc.) can be employed for implementing the rotatable interface between the panel 110 and the main body 107.

The main body 107 includes an upper recess 118 that is disposed about the digitizer 113, and is shaped to receive the panel 110, so that when the keyboard is disposed atop the main body 107 (see FIG. 22), the top of the keyboard is essentially flush with a top surface of the main body 107. While the recessed top surface is advantageous, it should be appreciated that the present invention is not limited in this respect, and that the main body 107 can alternatively be provided with a non-recessed surface atop which the keyboard 111 can rest.

Figure 26:
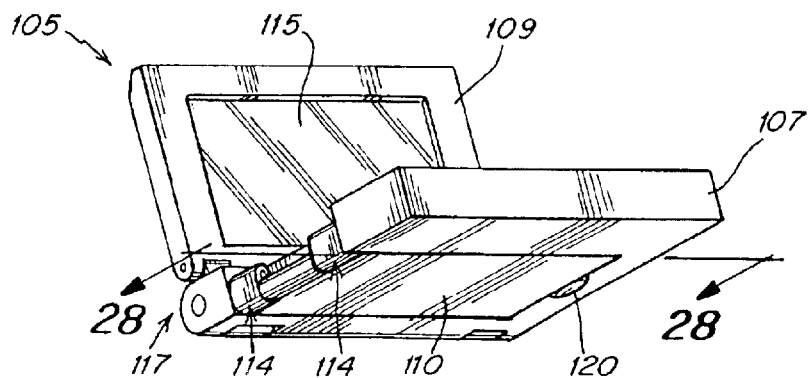
FIG. 26 is a perspective bottom view of the computer of FIGS. 21–25 in the open dual-digitizer configuration of FIG. 23.
Figure 28:
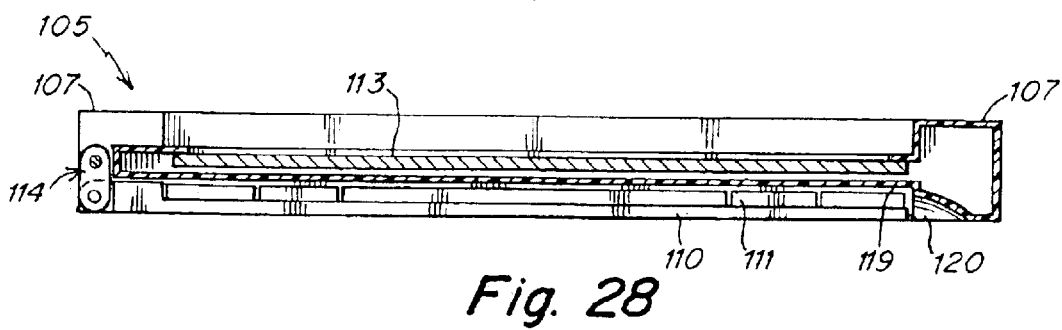
FIG. 28 is a cross-sectional view taken along line 28—28 of FIG. 26.
Figure 29:
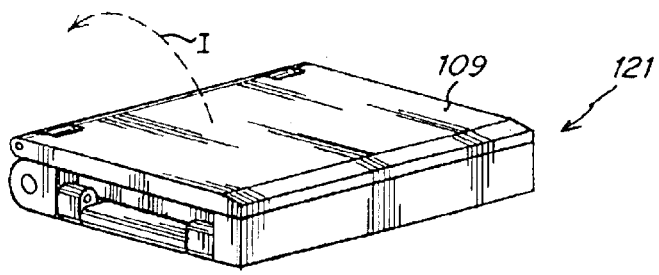
FIG. 29 is a perspective view of a computer according to an alternate embodiment of the present invention and in a closed configuration.
Figure 30:
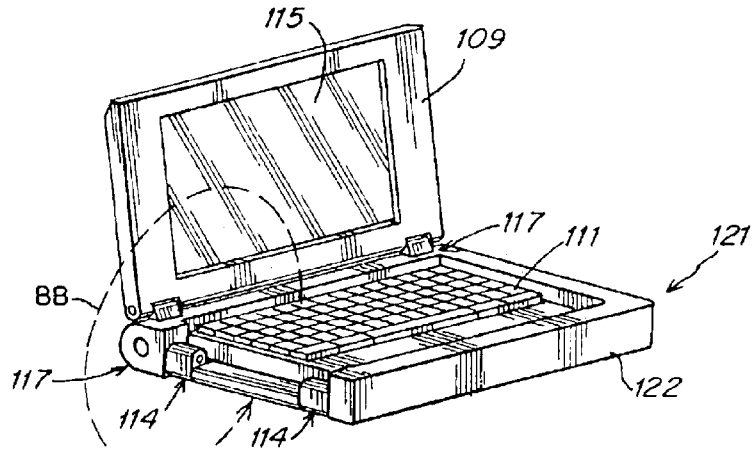
FIG. 30 is a perspective view of the computer of FIG. 29 in an open notebook configuration.
Figure 31:
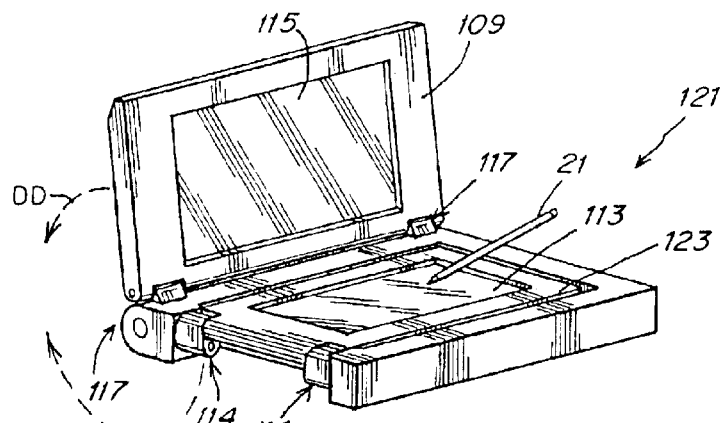
FIG. 31 is a perspective view of the computer of FIGS. 29–30 in an open dual-digitizer configuration.
Figure 32:
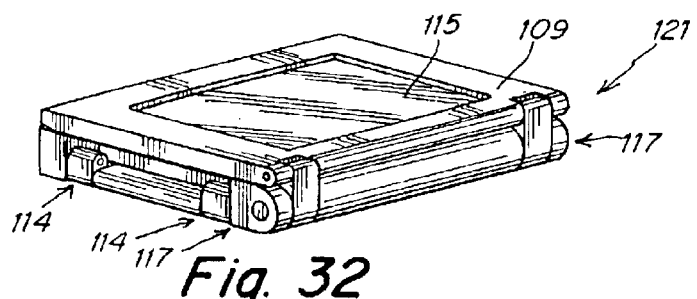
FIG. 32 is a perspective view of the computer of FIGS. 29–31 in a tablet configuration.

In the embodiment shown, the main body 107 also includes a bottom recess 119 that is sized to receive the panel 110 when the panel is rotated under the main body 107 to place the keyboard 111 in the non-use position (see FIGS. 26 and 28). In the embodiment shown, the bottom of the main housing includes a mating feature 120 adapted to releasably mate with the panel 110 to maintain the panel 110 in the non-use position. However, it should be appreciated that the present invention is not limited in this respect, as other types of mating features can be employed, or alternatively, the panel 110 can simply be placed in the non-use position without being locked therein.

Figure 21:
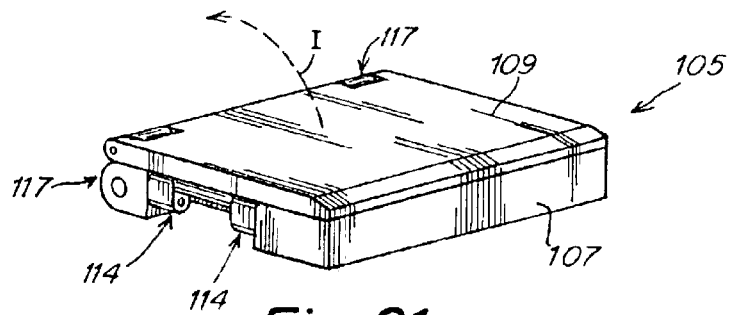
FIG. 21 is a perspective view of an alternate embodiment of the present invention in a closed configuration.

As mentioned above, the computer 105 can be placed in any of the four configurations discussed above in connection with the other embodiments of the present invention. FIG. 21 illustrates the computer 105 in a closed configuration, in which each of the interface devices is inaccessible to the user. The closed configuration can be achieved either with the panel 110 disposed in the upper recess 118 (as shown in FIG. 21), or in the lower recess 119 of the main body 107.

FIG. 22 illustrates the computer 105 in an open configuration that corresponds to a conventional open configuration for a notebook computer. In this open configuration, the display 115 and the keyboard 111 both are accessible to the user. The computer 105 is moved from the closed configuration of FIG. 21 to the open configuration of FIG. 22 by rotating the panel 109 in the direction of the arrow I in FIG. 21.

Figure 27:
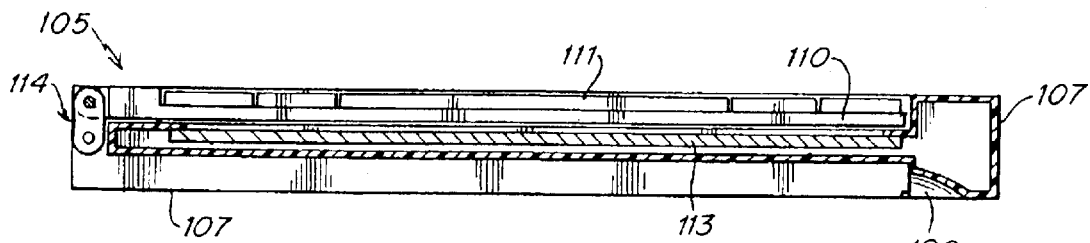
FIG. 27 is a cross-sectional view taken along line 27—27 of FIG. 25.

FIG. 23 illustrates the computer 105 in an open dual-digitizer configuration, such that the display 115 and the digitizer 113 both are accessible to the user. The computer 105 is moved from the open notebook configuration of FIG. 22 to the open dual-digitizer configuration of FIG. 23 by rotating the panel 110 about the dual hinge assemblies 114 in the direction of the arrow BB in FIG. 23 until the panel fits within the bottom recess 119 as shown in FIGS. 26–33. Similarly, to move from the dual-digitizer configuration of FIG. 23 to the notebook configuration of FIG. 22, the panel 110 is rotated in the opposite direction (i.e., in the direction of arrow CC in FIG. 23) until the panel 110 sits within the upper recess 118 in the main body 107 as shown in FIGS. 22 and 27.

Figure 24:
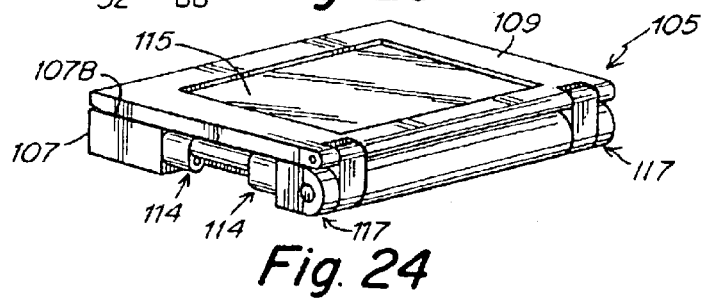
FIG. 24 is a perspective view of the computer of FIGS. 21–23 in a tablet configuration.
Figure 25:
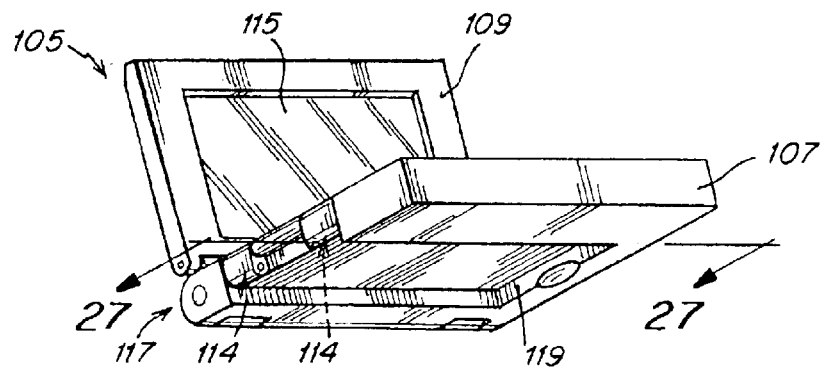
FIG. 25 is a perspective bottom view of the computer of FIGS. 21–24 in the open notebook configuration of FIG. 22.

Finally, FIG. 24 shows the computer 105 in the tablet configuration, wherein the panel 109 is disposed back-toback with the bottom 107B of the main housing 107, with the display 115 accessible to the user to receive input. The computer 105 is moved into the tablet configuration by rotating the panel 109 in the direction of arrow DD in FIG. 23, in much the same manner as with the embodiment of FIGS. 1–9 discussed above. The computer 105 can be placed in the tablet configuration with the panel 110 disposed either in the top recess 118 or in the bottom recess 119 of the main housing 107.

Another alternate embodiment of the invention is shown in FIGS. 29–32, and relates to a computer 121 that is similar in most respects to the embodiment of the present invention discussed above in connection with FIGS. 21–28, with the principal difference being that the keyboard 111 and digitizer 113 are reversed, such that the keyboard 111 is fixedly mounted to a main body 122 of the computer and the digitizer 113 is mounted to a panel 123 that is rotatably mounted to the main body 122 via the double hinge arrangement 114. The embodiment of the present invention illustrated in FIGS. 29–32 can be placed in each of the four configurations described above, in much the same manner as the embodiment of FIGS. 21–28.

A further alternate embodiment of the invention is shown in FIGS. 33–38. In this embodiment, the computer 137 includes three sections, a main body 144, a panel 139 rotatably mounted to the main body 144, and a module 143 detachably mounted to the main body 144. The main body 144 houses a processor and cables (not shown) for connecting the processor to connectors that in turn connect to the interface devices.

The panel 139 includes a display 169 fixedly mounted thereto. The panel 139 is rotatably mounted to the main body 144 via a pair of double hinge arrangements 167 which enable the panel to be moved between a closed configuration wherein the display 169 is adjacent a top surface of the main body 144 (as well as a top surface of the module 143) and is inaccessible, and a tablet configuration wherein the panel is disposed back-to-back with a bottom surface 144B (FIG. 38) of the main body, in much the same manner as the embodiments described above. The double hinge arrangements 167 can be implemented in a manner similar to the embodiments described above in connection with FIGS. 1–12. However, it should be appreciated that this embodiment of the present invention is not limited in this respect, and that the panel 139 can be configurably mounted to the main body 144 in numerous other ways.

The module 143 includes a keyboard 161 fixedly mounted on one surface thereof, and a digitizer 159 mounted to an opposite surface thereof. As with the embodiments described above, the keyboard 161 can be a full alphanumeric keyboard, or any other suitable keyboard, and the digitizer 159 can take any of numerous forms. The module 143 is attachable to the main body 144 with either the surface of the keyboard 161 or the surface of the digitizer 159 facing outwardly and accessible to the user. A mechanical interface is provided to detachably connect the module 143 to the main body 144, and an electrical interface is provided so that when the module 143 is mounted to the main body 144, the keyboard 161 and/or digitizer 159 is electrically coupled to the other components of the system (e.g., the processor and the display 169).

The mechanical interface between the main body 144 and the module 143 includes a pair of male mating features 149 that protrude from an upstanding face 150 of the main body 144, and corresponding pairs of openings 151 provided in the module to receive the male mating features 149. The male mating features may be tapered to a thickest section at the base that mates with the upstanding face 150 to facilitate insertion and automatic alignment. The interface between the features 149 and openings 151 prevents relative movement between the main body 144 and the end of the module 143 that mates with the features 149 in all directions except for a sliding axial direction as shown by the arrow LL in FIG. 35. The lower surface 144s of the main body 144 includes a pair of movable latches 155 protruding upwardly therefrom, with each latch being coupled to a release button 157 that disengages the latching mechanism when depressed. The surfaces of the module 143 that include the keyboard 161 and the digitizer 159 each is provided with a pair of openings 153 to receive the latches 155.

The module 143 is attached to the main body 144 by inserting the male features 149 into the openings 151, and then lowering the module down so that the latches 155 extend through the openings 153 on the module and engage an inner surface of the module body (not shown). The upper surface of the latches 155 optionally can be provided with a camming surface so that the latches 155 are automatically retracted when the module is pressed downwardly thereon, and the latches can be spring biased toward the upstanding face 150 of the main body to automatically revert back to the latching position. To release the module from the main body 144, the buttons 157 can be depressed to retract the latches 155, enabling the end of the module 143 that mates therewith to be lifted up and away from the latches 155, which then enables the module 143 to be slid off of the male features 149 in the direction of the arrow LL in FIG. 35. The module is provided with a pair of knurled surfaces 148 to facilitate handling of the module when engaging the module and/or disengaging the module from the main body 144.

It should be appreciated that the embodiment of the present invention that employs a detachable module is not limited to employing the specific mechanical features described above and shown in FIGS. 33–38, as numerous other mechanisms are possible for achieving a mechanical interface between the module 143 and the main body 144. For example, the latches 155 may be downwardly retractable so that the module 143 may be slid axially along the lower surface 144s of the main body when engaging and/or disengaging the module from the main body 144.

The embodiment of FIGS. 33–38 also includes some features or connectors to electrically couple the interface devices in the module 143 (e.g., the keyboard 161 and the digitizer 159 or other keyless user interface) to the processor (not shown). As a result of the connector interface, no cable is required to connect the main body 144 to the module 143, so that the connection is cable-less. In the embodiment shown in the figures, the upstanding face 150 of the main body 144 is provided with a connector 145 that is adapted to mate with either of a pair of connectors 163a, 163b provided on the module 143. Specifically, the connector 163b is electrically coupled to the keyboard 161, and the connector 163a is electrically coupled to the digitizer 159. Therefore, depending upon the orientation of the module 143, one of the connectors 163a, 163b is placed into mating engagement with the connector 145 on the main body 144, to provide an electrical connection between the keyboard 161 or the digitizer 159 and the processor. The upstanding face 150 is also provided with a recess opening 146 that is adapted to receive the one of the connectors 163a, 163b that is not active in a particular configuration. In one embodiment of the present invention, the connectors 145 and 163a, 163b are USB (universal serial bus) connections and the computer 137 is USB-compliant. It should be appreciated that the present invention is not limited to the particular connection scheme disclosed herein, as numerous other configurations are possible, including employing a wireless communication system between the main body 144 and the module 143, such that the keyboard 161 and/or the digitizer 159 can be employed even when the module is not physically engaged with the main body 144.

Figure 33:
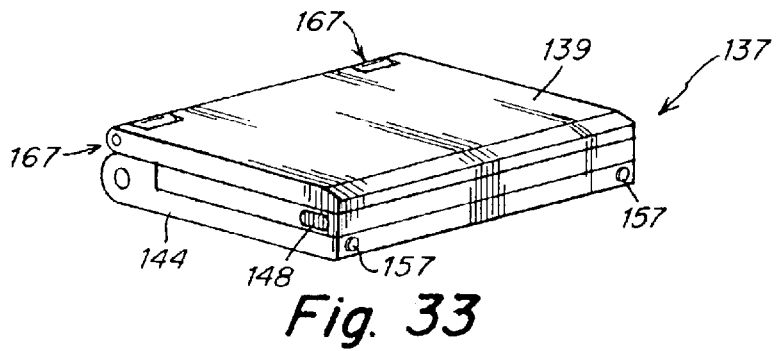
FIG. 33 is a perspective view of a computer according to an alternate embodiment of the present invention wherein the computer includes a detachable module and is illustrated in a closed configuration.

The computer 137 of FIGS. 33–39 is configurable in any of the four configurations discussed above in connection with the other embodiments of the present invention. FIG. 33 illustrates the computer 137 in a closed configuration, wherein none of the interface devices is accessible to the user.

Figure 34:
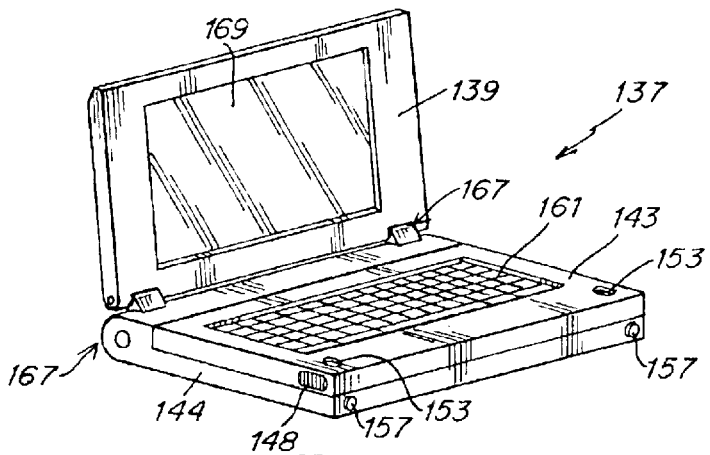
FIG. 34 is a perspective view of the computer of FIG. 33 in an open notebook configuration.
Figure 35:
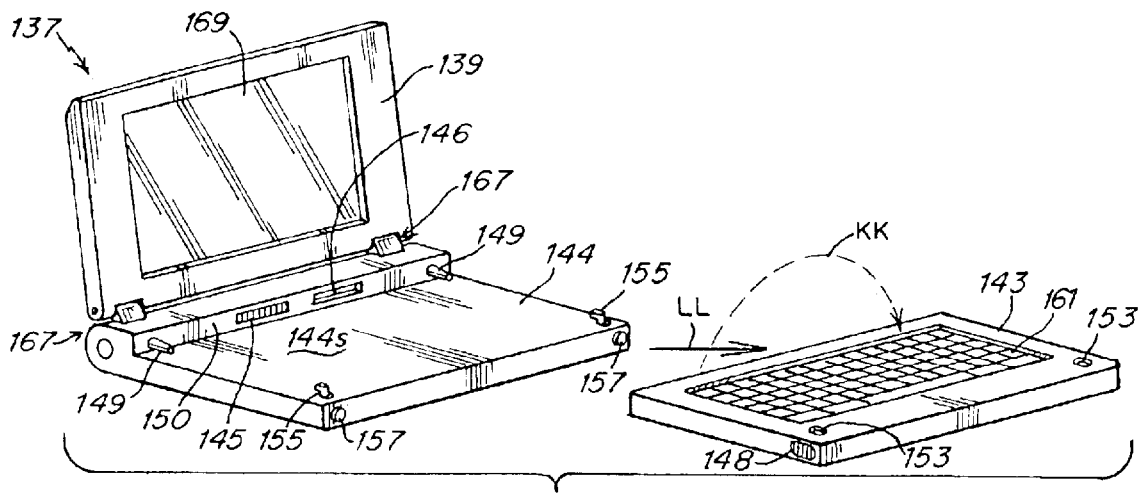
FIG. 35 is an exploded view of the computer of FIGS. 33–34 with the module detached.
Figure 36:
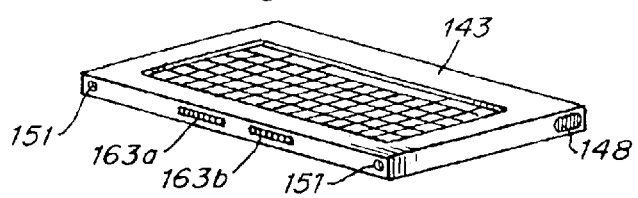
FIG. 36 is a perspective view of a module for use in the computer of FIGS. 33–35.

FIG. 34 illustrates the computer 137 in an open configuration that corresponds to a conventional notebook configuration, wherein the keyboard 161 and the display 169 both are accessible to the user. The computer 137 is moved from the closed configuration of FIG. 33 to the open configuration of FIG. 34 simply by rotating the panel 139 about the double hinge arrangements 167 in much the same manner as with the embodiments discussed above.

Figure 37:
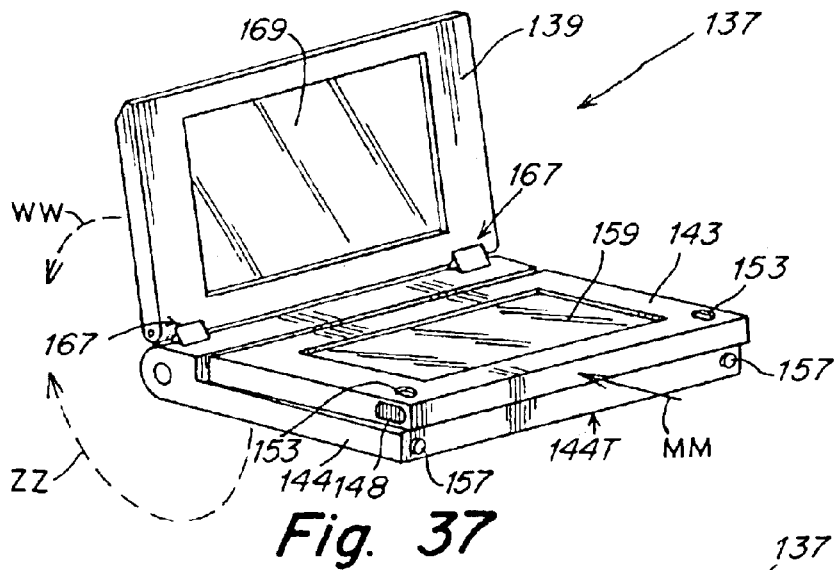
FIG. 37 is a perspective view of the computer of FIGS. 33–35 in an open dual-digitizer configuration.

FIG. 37 illustrates the computer 137 in an open dual-digitizer configuration, in which the digitizer 159 and the display 169 both are accessible to the user. The computer 137 is moved from the open notebook configuration of FIG. 34 to the open dual-digitizer configuration of FIG. 37 by: (1) detaching the module 143 from the main body 144 as represented by the arrow LL in FIG. 35; (2) flipping the module 143 over as represented by the arrow KK in FIG. 35; and (3) reengaging the module 143 with the main body 144 as suggested by the arrow MM in FIG. 37 so that the digitizer 159 is accessible. It should be noted that, with the exception of the embodiment wherein a wireless communication system is employed, the module 143 is electrically disconnected from the components in the main body 144 (e.g., the processor) when the module 143 is detached from the main body 144 while moving the computer 137 between the open notebook configuration and the open dual-digitizer configuration. As used herein, the term electrically disconnected refers to a condition whereby data that is inputted via the keyboard 161 or digitizer 159 is not transmitted to or received by the processor or other components in the main body 144. When the module 143 is reengaged with the main body 144, an electrical connection is reestablished, either between the processor and the keyboard 161 when the computer 137 is physically configured in the open notebook configuration or the processor and the digitizer 159 when the computer is physically configured in the open dual-digitizer configuration. Thus, the physical configuration of the computer in one of these modes determines the electrical connections between the interface devices on the module 143 and the processor.

Figure 38:
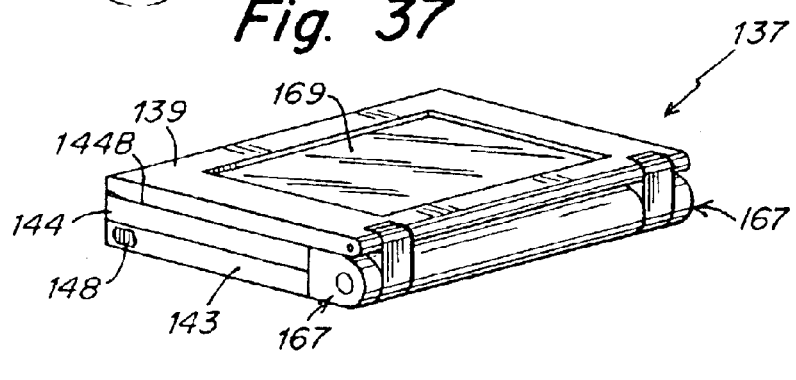
FIG. 38 is a perspective view of the computer of FIGS. 33–35 and 37 in a tablet configuration.

Finally, FIG. 38 illustrates the computer 137 in a tablet configuration, wherein the panel 139 is disposed back-to-back with a bottom 144B (FIG. 38) of the main body 144 to minimize the foot print of the computer, and the display 169 is accessible to the user. The computer 137 is moved from the open dual-digitizer configuration of FIG. 37 (or optionally from the open notebook configuration of FIG. 34) into the tablet configuration by rotating the panel 139 and/or the main body 144 in the direction of arrows WW and ZZ in FIG. 37, in much the same manner as with the embodiments of the invention described above.

While not shown in the figures, it is contemplated that alternative modules can also be used with the computer 137 to add various other types of interface devices (e.g., a scanner) to the computer, such that a user can reconfigure the computer 137 by changing modules as desired.

A further illustrative embodiment of the present invention is shown in FIGS. 39–44. This embodiment is similar in many respect to the embodiment of FIGS. 33–38, but includes a module that is not completely detachable from the main body.

The computer 173 includes a main body 175, a panel 139 and a module 177. As with the embodiment of FIGS. 33–38, the panel 139 has a display 169 mounted thereto and the panel 139 is mounted to the main body 175 via a pair of double hinges 210 (or any other suitable arrangement) that enables the display 169 to be placed in all the useful configurations discussed above, including the tablet configuration. In addition, like the embodiment of FIGS. 33–38 discussed above, the main body 175 houses the processor and cables (not shown) for connecting the processor to connectors that in turn connect to the interface devices.

Figure 40:
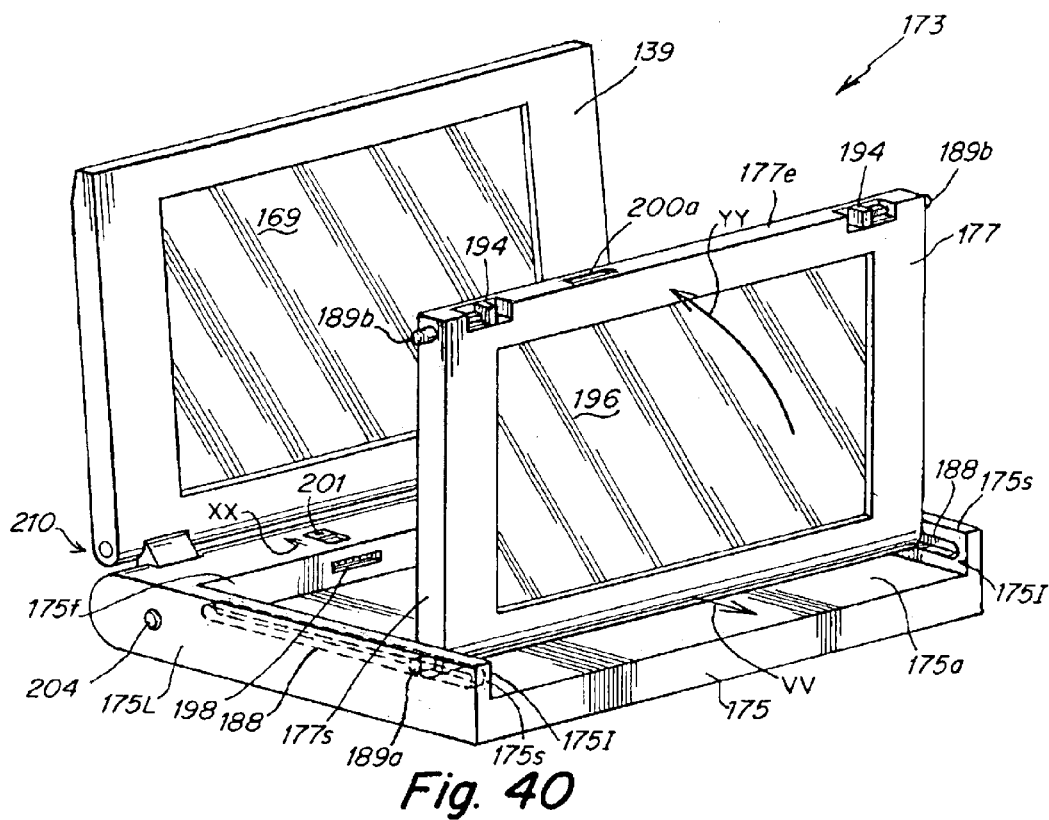
FIG. 40 is a perspective view of the computer of FIG. 39 being moved from the notebook configuration of FIG. 39 to a dual-digitizer configuration.

The module 177 includes a keyboard 192 and digitizer 196 mounted on opposite sides thereof. As shown in FIG. 40, the main body 175 includes a slot 175a that is bounded on one side by a rear upstanding face 175f, on second and third sides by a pair of side upstanding faces 175s, and is open on a fourth side. The slot 175a is sized to receive the module 177 with either the keyboard 192 or the digitizer 196 facing upwardly and accessible to the user.

Figure 41:
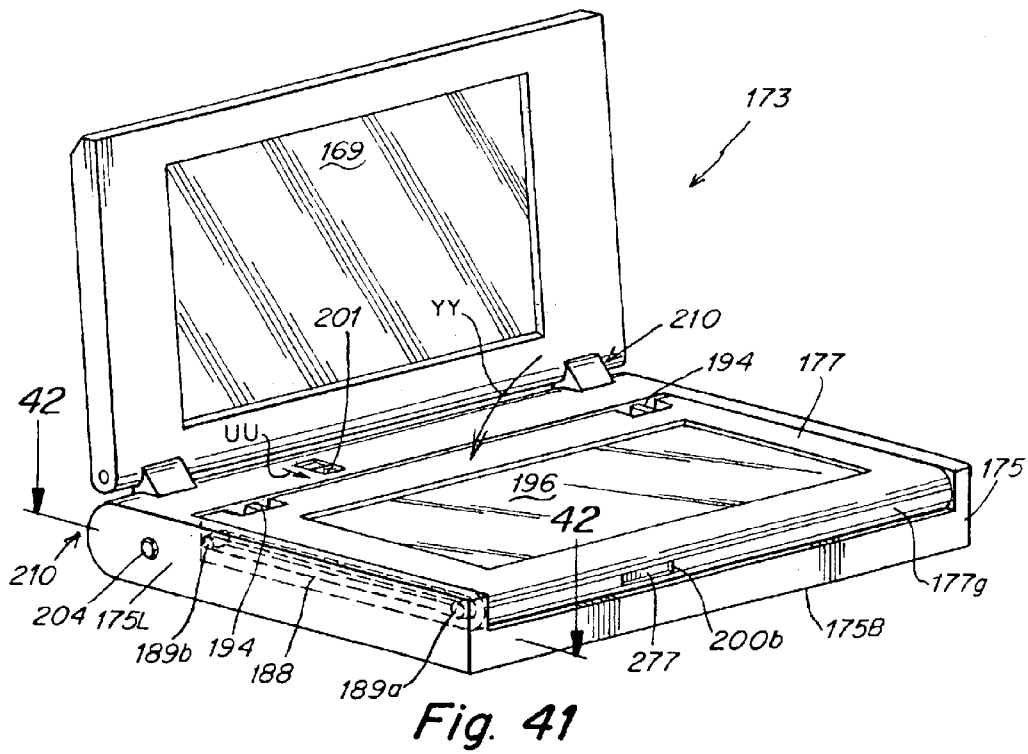
FIG. 41 is a perspective view of the computer of FIGS. 39–40 in the dual-digitizer configuration.

The module 177 is mounted to the main body 175 via nodes disposed on the module that interface with grooves on the main body. Specifically, a pair of cylindrical nodes 189a, 189b is provided on each of the left and right edges 177s of the module 177, and may be disposed within grooves 188 provided on inner surfaces 175I of the side upstanding faces 175s, as shown in FIGS. 40–41. In the embodiment shown, the nodes 189a are fixedly mounted to the module 177, and the nodes 189b are retractably mounted. Release triggers 194 are provided adjacent to the nodes 189b, and may be inwardly depressed to retract the nodes 189b within the module 177. A spring 203 (FIG. 42) is provided as part of the release mechanism, and allows the nodes 189b to automatically return to their normal position when the release triggers 194 are deactivated. Activating the release triggers 194 and retracting the nodes 189b allows the end 177e of the module 177 to be lifted in an upward direction away from the main body 175, such that only the nodes 189a remain housed within the grooves 188 as shown in FIG. 40. With only the nodes 189a engaged, the module 177 is both slidably and pivotally mounted to the main body 175 via the nodes 189a, enabling both axial sliding and rotation of the module 177 with respect to the main body. To move the module 177 axially, the nodes 189a may be slid along the length of the grooves 188, either toward or away from the rear upstanding face 175f of the main body 175. To rotate the module 177, the module may be pivoted about the nodes 189a, through approximately 180° relative to the main body 175.

It should be appreciated that the embodiment of the present invention that employs a module that is slidably mounted to the main body of the housing is not limited to the particular implementation for implementing the slidable, rotatable and lockable interface between the module and main body shown in FIGS. 40–41, as numerous other implementations are possible.

Electrical connections between the processor and the keyboard 192 and digitizer 196 can be accomplished in any of numerous ways, as the embodiment of the present invention that incorporates a sliding module is not limited to any particular implementation in this respect. In the embodiment shown in the figures, the rear upstanding face 175f of the main body 175 is provided with a connector 198 that is adapted to mate with either of a pair of connectors 200a, 200b provided on opposite edges 177e, 177g of the module 177. Specifically, a connector 200a is disposed on the edge 177e and is electrically coupled to the digitizer 196, while a connector 200b is disposed on the edge 177g and is electrically coupled to the keyboard 192. Therefore, depending upon the orientation of the module 143, one of the connectors 200a, 200b is placed into mating engagement with the connector 198 on the main body 175, to provide an electrical connection between the digitizer 196 or keyboard 192 and the processor. As a result of the connector interface described, no cable is employed between the main body 175 and the module 177, though cables (e.g., cable 208 in FIG. 43) may be employed within the main body 175 and the module 177 to electrically couple the connectors 198, 200a and 200b and the processor or their associated interface device.

In the embodiment shown, the connector 198 is a male connector (e.g., a USB connector) and the connectors 200a and 200b are compatible female connectors. The connector 198 is retractable into the main body 175, with a manual slide 201 (FIG. 43) being mounted to the main body 175 and mechanically coupled to the connector 198 to retract the connector 198 when moved in the direction of the arrow XX, shown in FIG. 40. Similarly, the manual slide 201 may be moved in the direction of the arrow UU, shown in FIG. 41, to engage the connector 198 with either of the connectors 200a, 200b. The retractable nature of the connector 198 allows the module 177 to be moved from its position in FIG. 40 to its position in FIG. 41, for example, without obstruction. It should be appreciated that the present invention is not limited to employing the particular implementation of the connector 198 shown in the figures, as a fixed connector (as opposed to a retractable connector) can alternatively be employed, or other arrangements for implementing a retractable connector (e.g, a biased connector) can alternatively be employed.

Figure 43:
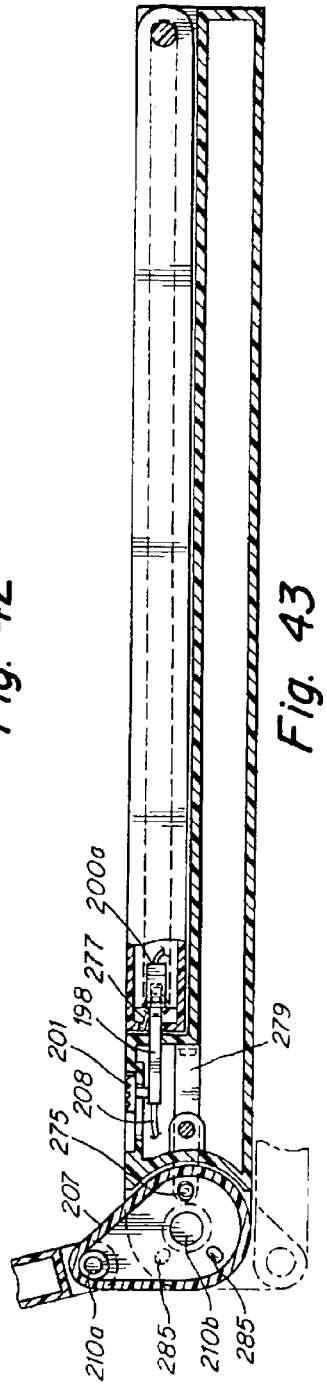
FIG. 43 is a partial cross-sectional side view of the computer of FIGS. 39–41.

In the embodiment shown, the openings in the module 177 for female connectors 200a, 200b are each mounted with a spring-loaded covers 277, one of which is shown in FIG. 43. The covers 277, hingedly connected at the openings, close off the openings and protect the female connectors 200a, 200b from damage when they are not engaged with the male connector 198. When the manual slide 201 is moved so as to engage the connector 198 with one of the connectors 200a, 200b, the male connector 198 flips the corresponding one of the covers 277 upwardly within the module 177. Although the covers 277 provide the advantages discussed above, it should be appreciated that they are not required, and can alternatively not be employed.

Figure 42:
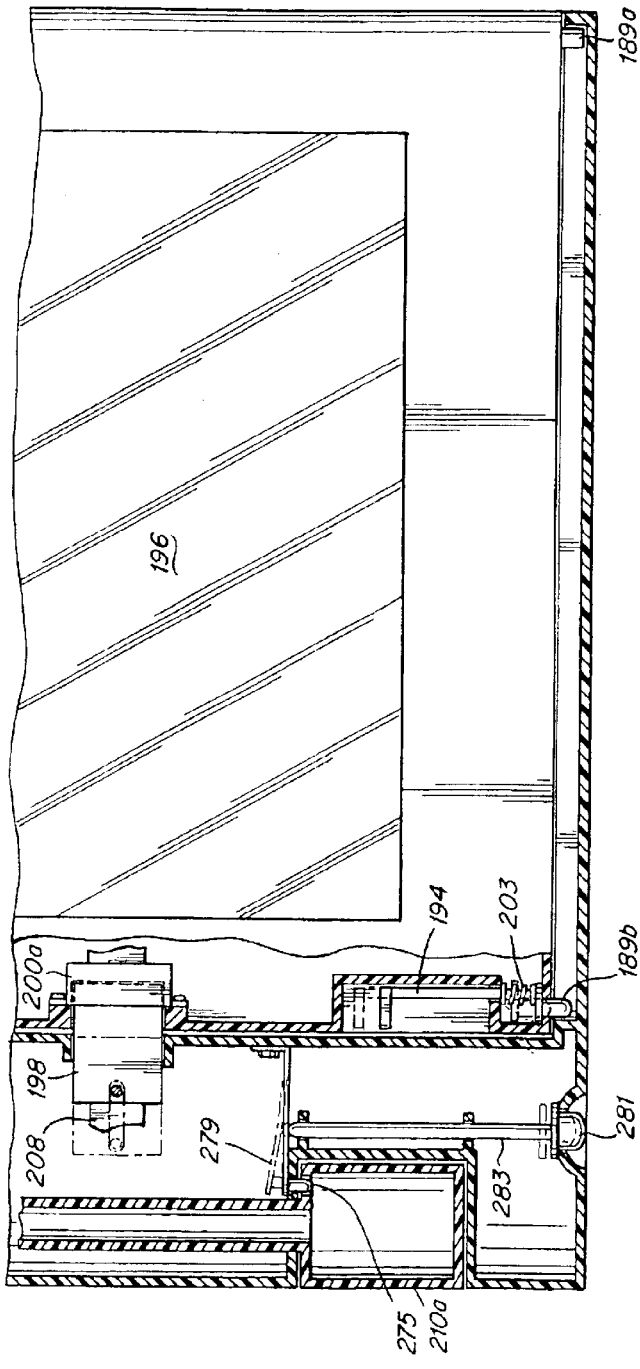
FIG. 42 is a partial cross-sectional top view, taken along line 42—42 in FIG. 41, of the computer of FIGS. 39–41 in the dual-digitizer mode.

The panel 139 that houses the display 169 is connected to the main body 175 via a pair of double hinges 210, each including a small hinge 210a and a larger hinge 210b. The pair of double hinges 210 is substantially similar to the double hinge arrangements of previous embodiments, with the exception of an added locking mechanism that secures the larger hinges in a desired position. In the embodiment shown, the locking mechanism includes a locking pin 275, a hinge release button 281, a leaf spring 279, a push rod 283, and engagement holes 285 provided in the larger hinge 210b. When the locking pin 275 is disposed through one of the engagement holes 285, rotation of the larger hinge 210b relative to the main body 175 is prevented, so that the hinges 210b are locked. The hinges 210b may be moved into a new position by depressing the hinge release button 281, which is provided on the side of the main body 175L near the pair of double hinges 210. When depressed, the push rod 283 connected to the hinge release button 281 displaces a flexible leaf spring 279 and the locking pin 275 fixedly mounted thereto, as shown in FIG. 42. The locking pin 275 is thus disengaged from one of the three engagement holes 285, so that the larger hinges 210b may then be rotated to a new position. When the hinge release button 281 is pressed, the larger hinge 210b may be rotated to any new position. However, when the button 281 is no longer depressed, the hinges 210b may be freely about rotated about their axis until the locking pin 275 enters one of the engagement holes 285, to lock the hinge 210b in a new position. Though FIG. 41 shows three engagement holes, and thus three possible positions for the hinges 210b, any suitable number of holes may be used. In the embodiment shown, a locking mechanism is employed only for one of the larger hinges 210b, but it should be appreciated that another locking mechanism can be provided for the other hinge, either in addition to or in place of the locking mechanism shown.

It should be appreciated that the embodiment of the present invention that employs a locking mechanism for the dual hinge assembly is not limited to the particular implementation shown in the figures and described above, as numerous other implementations are possible (e.g., a friction hinge). Furthermore, it should be appreciated that while a locking mechanism for the dual hinge assembly is only shown in connection with the embodiment of FIGS. 40–41, that such a locking arrangement can be used with any of the other embodiments of the present invention that employs a hinge.

Figure 39:
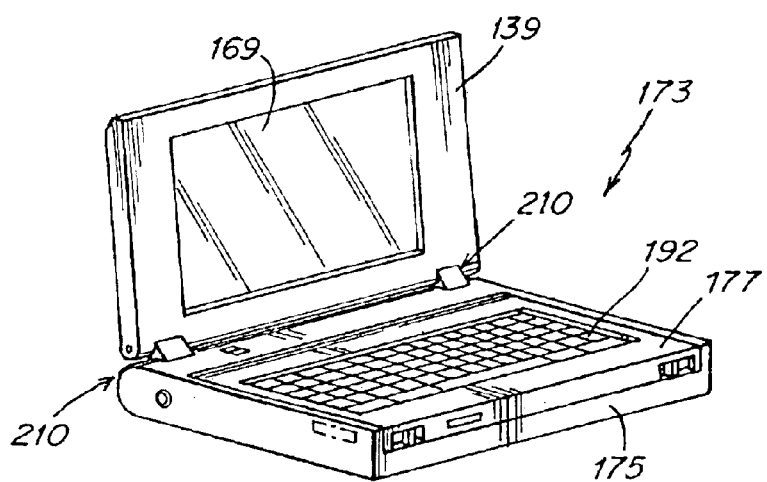
FIG. 39 is a perspective view of an alternate embodiment of the present invention employing a sliding module, with the computer illustrated in an open notebook configuration.

The embodiment of FIGS. 39–44 can be arranged in any of the four configurations discussed above in connection with the other embodiments of the present invention. FIG. 39 illustrates the computer 173 in an open notebook configuration, wherein the display 169 and keyboard 192 both are accessible to the user. While not shown in the figures, the computer 173 can be moved to the closed configuration simply by moving the panel 139 down toward the module 177 so that the display 169 is disposed adjacent the keyboard 192, such that none of the interface devices is accessible to the user. In addition, while not shown in the figures, the computer 173 also can be moved to the tablet configuration by rotating the panel 139 in the opposite direction, such that it sits back-to-back with a bottom 175B (FIG. 41) of the main housing with the display 169 being accessible to the user, in much the same manner as the embodiments discussed above.

FIG. 41 illustrates the computer 173 in the open dual-digitizer configuration, wherein the display 169 and digitizer 196 each is accessible to the user. The computer 173 is moved between the open notebook configuration of FIG. 39 and the dual-digitizer configuration of FIG. 41 by first moving the manual slide in the direction of the arrow XX to retract the connector 189, second inwardly depressing the release triggers to retract the nodes 189b, third lifting the end of the module 177 upward, and finally sliding the module 177 toward or away from the upstanding face 175f of the main body and rotating the module 177 down into the desired position. For example, to move from the notebook configuration of FIG. 39 to the dual-digitizer configuration of FIG. 41, the nodes 189a are slid away from the upstanding face 175f of the main body 175 in the direction of arrow VV in FIG. 40, and the module 177 is rotated down in the direction of arrow YY in FIG. 40 into the position shown in FIG. 41. Of course, to move from the dual-digitizer configuration of FIG. 41 to the notebook configuration of FIG. 39, the sliding and rotational movement of the module 177 is simply reversed from that discussed above.

An alternate embodiment of the present invention is illustrated in FIGS. 44–48. This embodiment is substantially similar to the previous embodiment, but has a modified system for securing the module 288 to the main body 290. Most notably, the retractable nodes 189b have been removed from the module 288 and a hinged door 287 has been added to the main body 290.

The computer 301 includes a main body 290, a panel 319 and a module 288. As with the previous embodiment, the panel 319 has a display 317 mounted thereto and the panel 319 is mounted to the main body 290 via a pair of double hinges 315 (or any other suitable arrangement) that enables the display 317 to be placed in all of the useful configurations discussed above, including the tablet configuration. In addition, like the embodiment discussed above, the main body 290 houses the processor. The main body 290 of this embodiment is similar to that of FIGS. 39–43 in that a slot 290a is provided that is bounded on one side by a rear upstanding face 290f and on second and third sides by a pair of side upstanding faces 290s. Additionally, an overhang 290c (FIG. 48), extends slightly beyond the rear upstanding face 290f above the slot region. A connector 307 and a pair of spring loaded plungers 309 are fixedly mounted on the rear upstanding face 290f of the main body 290, beneath the overhang 290c. The connector 307 mates with either one of two connectors 297a, 297b on the module 288 to electrically couple the processor of the main body 290 to the digitizer 311 or keyboard 313 of the module 288, respectively. In one embodiment, the connector 307 is a male USB connection, while the connectors 297a, 297b are female USB connections. However, it should be appreciated that various other types of connectors can be used for electrically coupling the processor to the interface devices of the module 288, and the male 307 and female connectors 297a, 297b may be reversed between the main body 290 and the module 288. The spring loaded plungers 309 are provided to facilitate ejection of the module 288 from beneath the overhang and disengagement of the connector 307 from one of the connectors 297a, 297b, as will be subsequently described.

Figure 46:
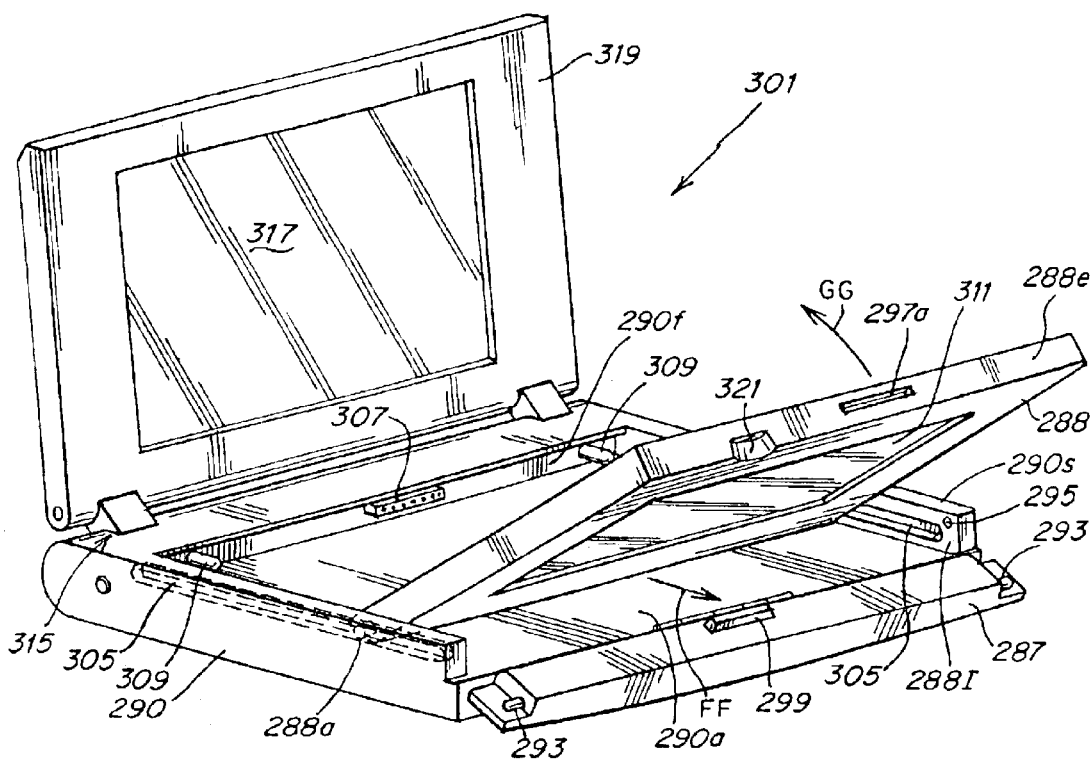
FIG. 46 is a perspective view of the computer of FIGS. 44–45 being moved from the notebook configuration of FIG. 44 to a dual-digitizer configuration.
Figure 48:
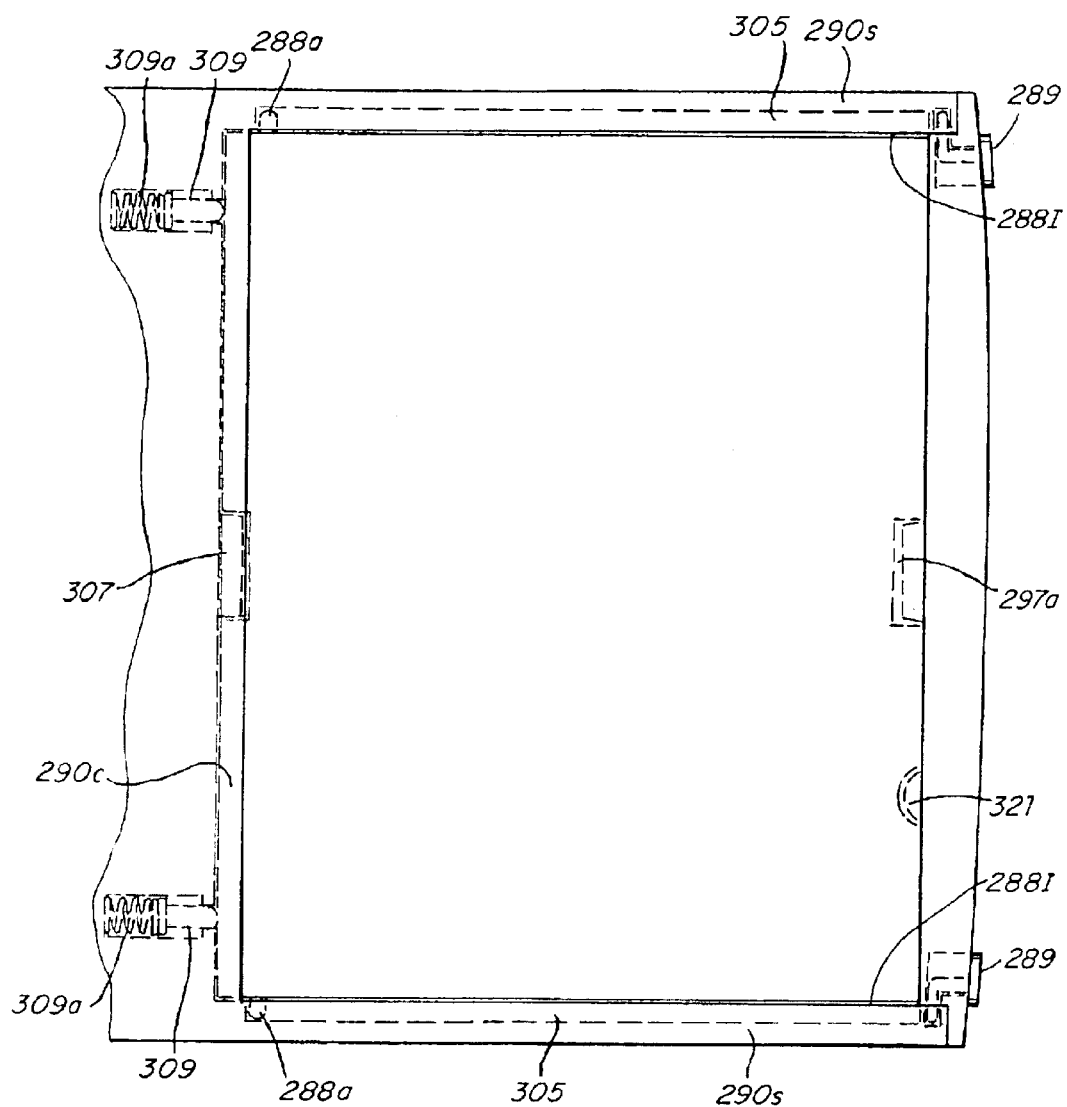
FIG. 48 is a partial top view of the computer of FIGS. 44–47 in the open notebook configuration of FIG. 44.

The slot 290a is of approximately the same dimensions as the module 288 and houses the module 288 with either the keyboard 192 or the digitizer 196 facing upward and being accessible to the user. A groove 305 (FIGS. 46 and 48) is provided on each of the inner surfaces 288I of the side upstanding faces 288s and a pair of compatible nodes 288a are provided on opposite ends of the module 288, as shown in FIGS. 46 and 48. The pair of grooves 305 receive the nodes 288a to allow the module 288 to be slidably and rotatably mounted to the main body 290. As shown in FIG. 46, the module 288 is both slidably and pivotally mounted to the main body 290 via the nodes 288a, enabling both axial sliding and rotational movement of the module 288 with respect to the main body. To move the module 288 axially, the nodes 288a may be slid along the length of the grooves 305, either toward or away from the rear upstanding face 288f of the main body 290. To rotate the module 288, the module may be pivoted about the nodes 288a, through approximately 180° relative to the main body 290.

Figure 44:
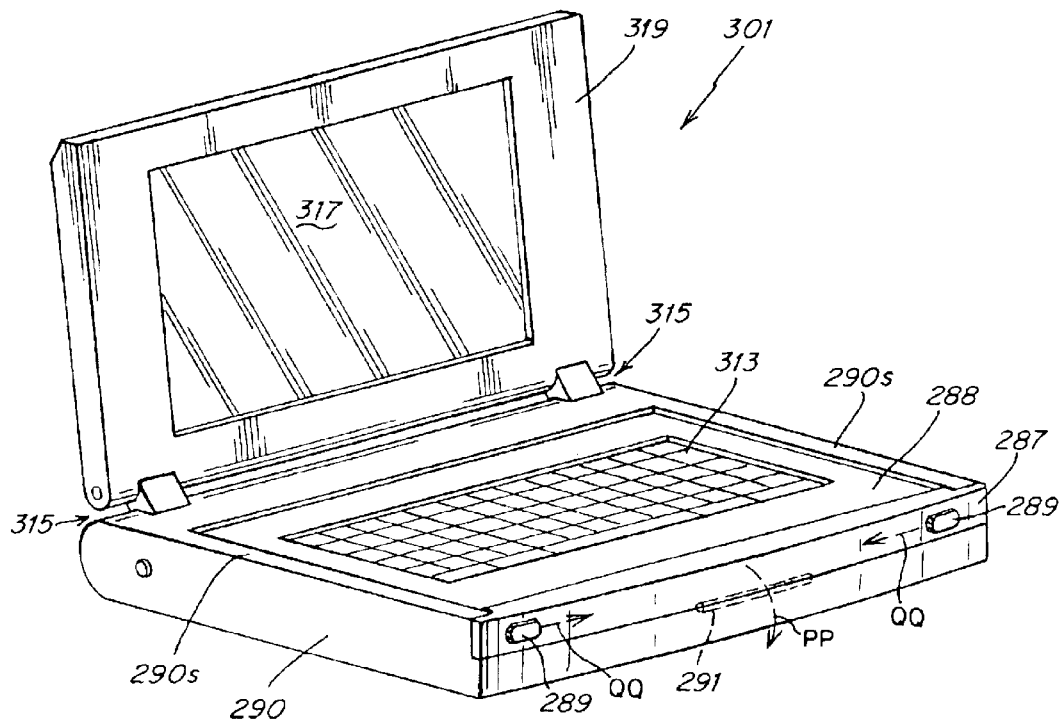
FIG. 44 is a perspective view of an alternate embodiment of the present invention employing a sliding module, with the computer illustrated in an open notebook configuration.
Figure 45:
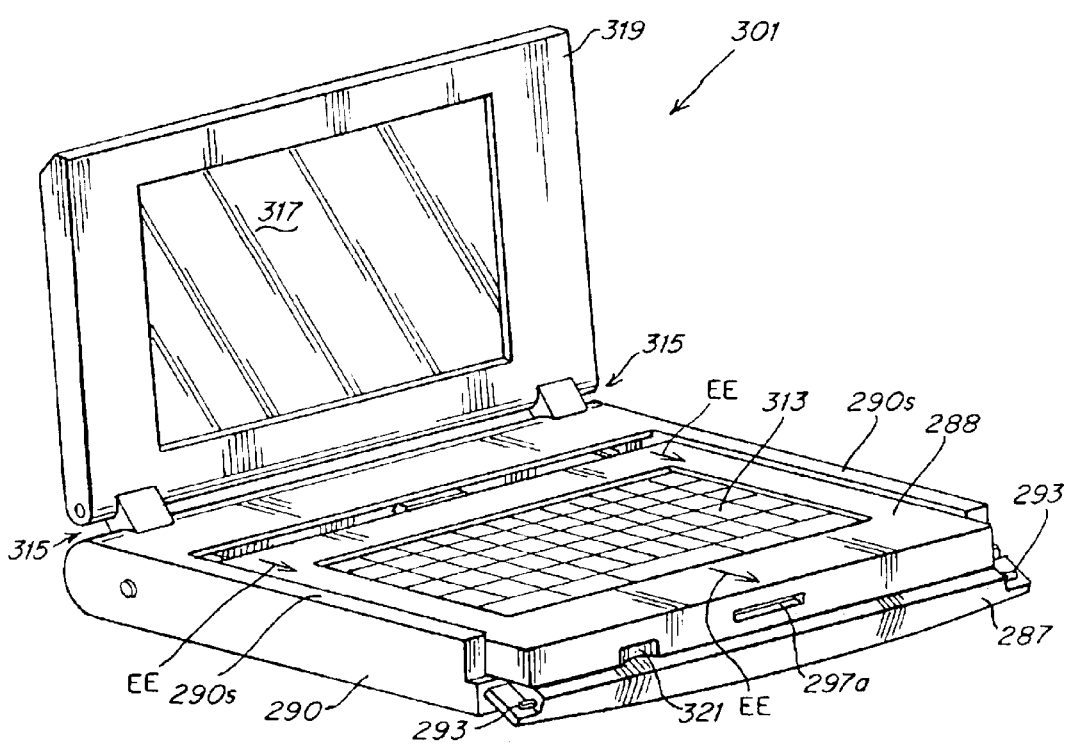
FIG. 45 is a perspective view of the computer of FIG. 44 being moved from the notebook configuration of FIG. 44 to a dual-digitizer configuration.

The main body 290 is provided with a door 287, hingedly attached at the unbounded side of the slot 290a via a hinge 291 (FIG. 44). In the embodiment shown, the door 287 is provided with a dummy male connector 299 that has no electrical functionality and is adapted to mechanically mate with either of the female connectors 297a, 297b provided on the module 288. When the door is in the closed position of FIG. 44, relative movement between the module 288 and the main body 290 is prevented. Specifically, axial movement of the module 288 in the direction of arrow EE (FIG. 45) is prevented by the door. Shifting of the ends of the module away from a floor of the slot 290a is also inhibited. For example, lifting of the end of the module 288 to which the nodes 288a are attached is inhibited by engagement of the nodes 288a in the grooves 305. For the free end of the module 288 that does not have the nodes 288a attached, a mechanism is provided for preventing lifting in both the open notebook configuration of FIG. 44 and the dual-digitizer configuration. When in the dual-digitizer configuration, the end 288e of the module is disposed underneath the overhang 290c provided on the main body 290, which prevents the end 288E of the module from lifting upwardly. Conversely, when the end 288E is disposed adjacent the door 287 in the notebook configuration of FIG. 44, engagement between the dummy male connector 299 and the connector 297a on the module 288 prevents the end 288e of the module from lifting upwardly. It should be appreciated that the particular implementation discussed above is provided merely for illustrative purposes, as numerous other alternatives can be employed for securing the module 288 in a locked position in the slot 290s, such that the overhang 290c and the dummy male connector 299 can be replaced with other components.

In the embodiment shown, the door 287 is provided with a pair of pins 293 that mate with a corresponding pair of pin holes 295 (FIG. 46) in the sidewalls 290s of the main body to lock the door 287 in the closed position. A pin release slide 289 is associated with each of the pins 293, and is moved inwardly in the direction of arrows QQ (FIG. 44) to disengage the pins 293 from the pin holes 295 and allow the door to be opened. It should be appreciated that this is merely one example of a way of locking the door 287, as numerous other arrangements are possible.

The implementation shown also includes a pair of features to facilitate engagement and disengagement of the female connectors 297a, 297b on the module with the male connector 307 on the main body 290. Specifically, when the module is moved between the open notebook and dual-digitizer configurations, the door 287 is opened to enable the module 288 to be slidably and rotatably moved relative to the main body 290 to achieve the desired change in configuration. When the door 287 is open, the module 287 is automatically disengaged from the male electrical connector 307 and is mechanically disengaged from the overhang 290c via the spring loaded plungers 309, which automatically slidably ejects the module 288 in the direction of the arrows EE in FIG. 45. When the end 288e of the module 288 that does not include the nodes 288a is disposed adjacent the door, the end 288e of the module can extend beyond the slot 290, and can be grasped by the user and rotated in the direction of arrow GG (FIG. 46) to reconfigure the module. Alternatively, when the end 288e is disposed adjacent the upstanding face 290f of the slot, movement of the panel 288 out of the slot is limited by engagement between the nodes 288a and the grooves 305. However, the grooves are sized so that the panel 288 can slide sufficiently back away from the upstanding face 290f to free the end 288e of the module from the overhang 290c. As a result, the end 288e of the module can be grasped by the user and rotated upwardly away from the bottom surface of the slot 290a. In the embodiment shown, a recess 321 is provided to facilitate grasping of the module by the user. Of course, it should be appreciated that the present invention is not limited in this respect, as other techniques can be employed to facilitate grasping, or alternatively, no feature need be employed for this purpose. In addition, while the spring loaded plungers 309 provide the advantages discussed above, it should further be appreciated that other techniques can be employed for automatically causing disengagement of the module 288 when the door 287 is opened, or alternatively, no mechanism need be provided for this purpose, as the module 288 can simply be moved manually.

The other feature provided in the implementation shown in the figures to facilitate electrical and mechanical engagement between the module 288 and the upstanding face 290*f* of the main body relates to the configuration of the door 287. Specifically, in the implementation shown, the door 287 is provided with a rounded edge 287*a*, which is adapted to smoothly mate with the module 288 when the door is moved, in the direction of arrow OO in FIG. 47, from the opened to the closed position. Thus, the door 287 can act as a cam that urges the module 287 in the direction of NN in FIG. 47 to ensure secure engagement between the male connector 307 on the main body and either of female connectors 297*a*, 297*b* on the module 288, as well as secure mechanical engagement between the module 288 and the overhang 290*c* on the main body. In this respect, closing the door 287 urges the module 288 against the spring loaded plungers 309, and overcomes the biasing force thereof to enable the module 288 to be securely locked into engagement with the main body 290 in either of the open notebook and dual-digitizer configurations.

The embodiment of FIGS. 44–48 can be arranged in any of the four configurations discussed above in connection with the other embodiments of the present invention. FIG. 44 illustrates the computer 301 in an open notebook configuration, wherein the display 317 and keyboard 313 both are accessible to the user. While not shown in the figures, the computer 301 can be moved to the closed configuration simply by moving the panel 319 down towards the module 290 so that the display 317 is disposed adjacent to the keyboard 313, and none of the interface devices are accessible to the user.

Figure 47:
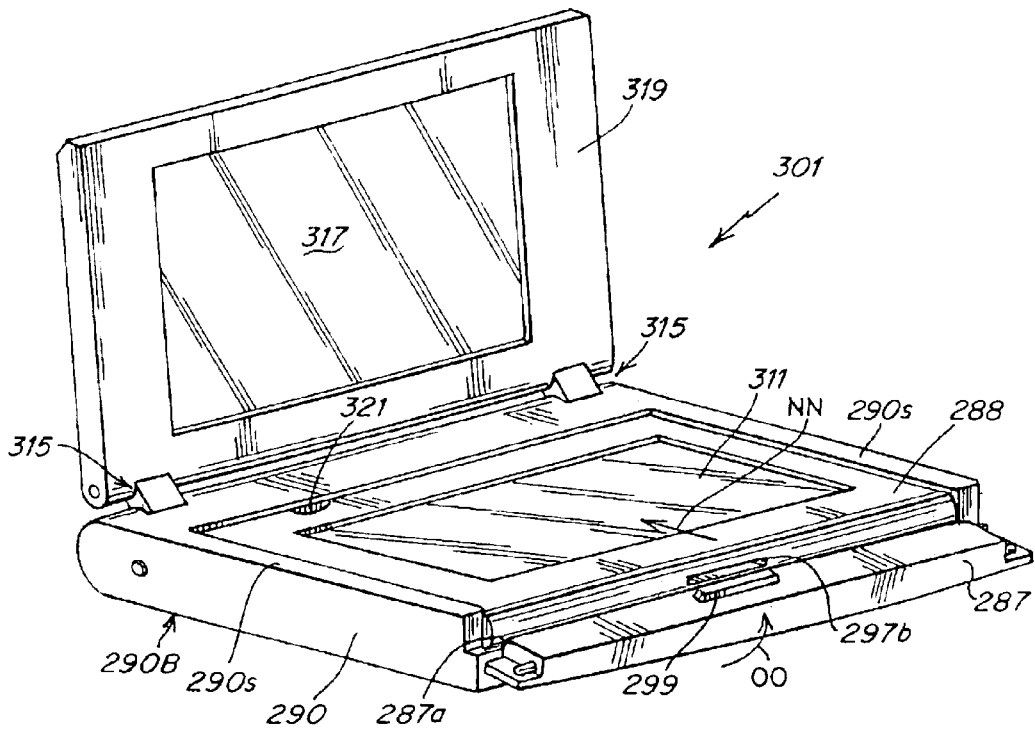
FIG. 47 is a perspective view of the computer of FIGS. 44–47 in the dual-digitizer mode.

FIG. 47 illustrates the computer 301 nearly in the open dual-digitizer configuration (it would be in the dual-digitizer configuration if the door 287 were closed), wherein the display 317 and digitizer 311 are each accessible to the user. The computer 301 is moved between the open notebook configuration of FIG. 44 and the dual-digitizer configuration of FIG. 47 by: (1) opening the door 287 by moving the pin release slides 289 inwardly in the direction of the arrows QQ (FIG. 44) and moving the door downward in the direction of the arrow PP to eject the module 288 as shown by the arrows EE in FIG. 45; (2) sliding the module outwardly in the direction of the arrow FF (FIG. 46) and rotating the end 288*e* of the module toward the face 290*f* in the direction of the arrow GG (FIG. 46), until the module rests within the slot 290*a*, as shown in FIG. 47; (3) closing the door 287 by moving the pin release slides 289 inwardly in the direction of the arrows QQ to retract the pins 293 within the module 288, while moving the door 287 upward in the direction of the arrow OO, as shown in FIG. 47; and (4) locking the door 287 by moving the pin release slides 289 outwardly to engage the pins 293 with the pin holes 295 and secure the door 287 in an upright position.

To move from the dual-digitizer configuration of FIG. 47 to the notebook configuration of FIG. 44, the sliding and rotational movement of the module 177 is simply reversed from that discussed above.

While not shown in the figures, the computer 301 can also be moved from either of the open notebook configuration (FIG. 44) or the dual-digitizer configuration to the tablet configuration by rotating the panel 319 backwards, such that it sits back-to-back with a bottom 290B (FIG. 47) of the main body 290 with the display 317 being accessible to the user, in much the same manner as the embodiments discussed above.

An alternate embodiment of the present invention is illustrated in FIGS. 49–52. In this embodiment, the computer 184 has three sections, including a main body 205, a panel 207 rotatably mounted thereto, and a panel 209 slidably received within the main body 205. As with the embodiments described above, the processor can be housed in the main body 205, which can also include cables for electrically coupling the processor to the interface devices.

Figure 50:
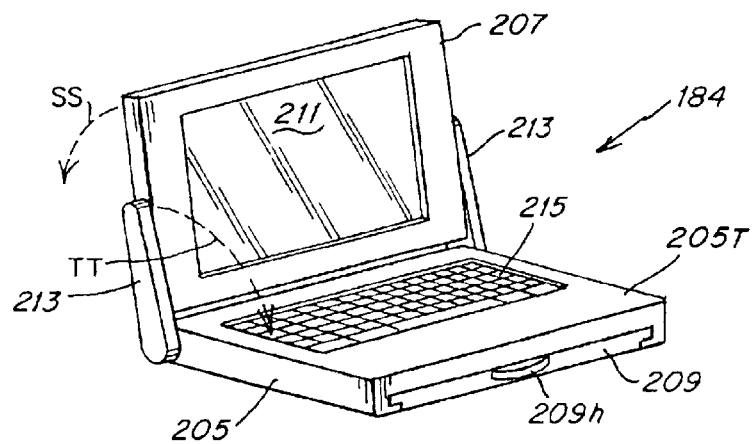
FIG. 50 is a perspective view of the computer of FIG. 49 in an open notebook configuration.
Figure 52:
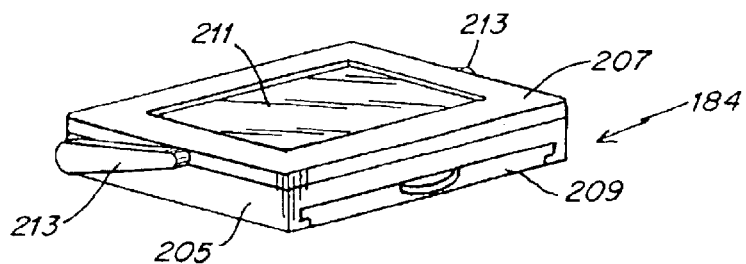
FIG. 52 is a perspective view of the computer of FIGS. 49–51 in a tablet configuration.

The panel 207 includes a display 211 fixedly mounted thereto. The panel 207 is rotatably mounted to the main body 205 so that it can achieve all of the desired configurations discussed above in connection with the other embodiments of the invention, including a typical notebook configuration as shown in FIG. 50 and a tablet configuration as shown in FIG. 52. In the particular embodiment shown, the panel 207 is rotatably mounted to the main body 205 via a pair of arms 213 that work in much the same manner as the arms described above in connection with the embodiment of FIGS. 13–20. However, it should be appreciated that this embodiment of the present invention is not limited to employing an arm arrangement for rotatably mounting the panel 207 to the main body 205, as numerous other alternatives are possible, including the use of a double hinge arrangement as discussed above in connection with numerous other embodiments, a living hinge as discussed below, and numerous other options.

The main body includes a keyboard 215 fixedly mounted thereto, as well as a drawer-type opening (not shown) to slidably receive the panel 209. The panel 209 has a digitizer 217 fixedly mounted thereto, and is sized and shaped to be received in the drawer-type opening (not shown) in the main body 205.

Figure 49:
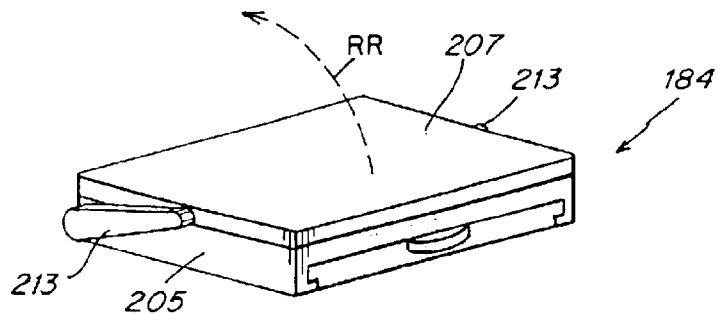
FIG. 49 is a perspective view of a closed configuration of an alternate embodiment of the present invention that includes a drawer-type sliding arrangement for mounting the digitizer to the computer.

As discussed above, the computer 184 can be placed in any of the four configurations discussed above in connection with the other embodiments of the present invention. FIG. 49 illustrates the computer 184 in a closed configuration, wherein none of the interface devices is accessible to the user. FIG. 50 illustrates the computer 184 in an open configuration corresponding to a conventional notebook configuration, wherein the display 211 and the keyboard 215 both are accessible to the user. The computer 184 can be moved from the closed configuration of FIG. 49 to the open notebook configuration of FIG. 50 simply by rotating the panel 207 and arms 213 in the direction of arrow RR in FIG. 49.

Figure 51:
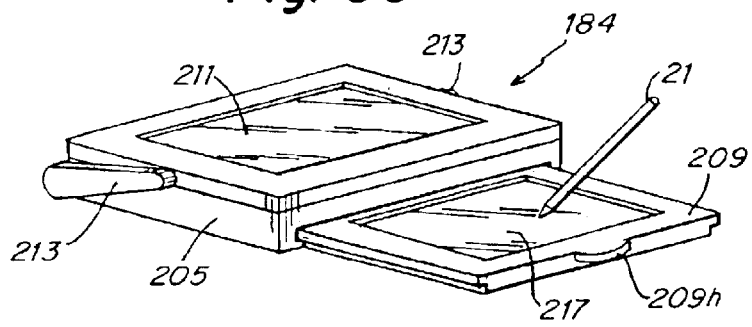
FIG. 51 is a perspective view of the computer of FIGS. 49–50 in an open dual-digitizer configuration.

FIG. 51 illustrates the computer 184 in the open dual-digitizer configuration. The computer 184 can be moved from the open notebook configuration of FIG. 50 to the open dual-digitizer configuration of FIG. 51 by pivoting the panel 207 (in the direction of arrow SS in FIG. 50) about the arms 213, and rotating the arms 213 downwardly (in the direction of arrow TT in FIG. 50) so that the panel 207 sits back-to-back with a top surface 205T of the main body 205, and then further by pulling the panel 209 forward from the drawer-type opening within the main body 205 to expose the digitizer 217. As shown in the drawings, the panel 209 may include a handle 209H to facilitate movement of the panel 209 into and forward from the drawer-type opening in the main body 205.

In one embodiment, a stop optionally may be employed to prevent the panel 209 from being pulled out of the drawer-type opening entirely, such that the panel 209 is no longer in contact with the main body 205. Of course, it should be appreciated that a stop is not necessary, and need not be provided, for example according to another embodiment whereby the panel 209 may be fully detached from the main body. According to the detachable panel embodiment, a wireless connection may be used to electrically couple the digitizer 217 to the processor, although any suitable means of electrically coupling the digitizer may be used, as the embodiment of the present invention that incorporates a drawer-type opening in the main body and an associated panel having a digitizer is not limited in this respect. In yet another embodiment, a locking mechanism is provided to prevent relative movement of the panel 209 with respect to the main body 205 when the panel 209 is fully stored within the main body, that may be disengaged to enable the digitizer 217 on the panel 209 to be made accessible to the user. It should be appreciated that the present invention is not limited to employing the particular type of locking mechanism, as numerous other types are possible. In addition, while a locking mechanism is desirable, it is not essential.

Finally, the computer 184 can be placed in the tablet configuration as shown in FIG. 52. The computer can be moved from the dual-digitizer configuration to the tablet configuration of FIG. 52 by simply returning the panel 209 to its stored position within the draw-type opening in the main body 205.

It should be appreciated from the foregoing that the embodiment of FIGS. 49–52 can also be employed in a yet a fifth configuration (not shown) wherein all of the display 211, the keyboard 215 and the digitizer 217 are accessible to the user. The computer can be moved from the open notebook configuration of FIG. 50 to this fifth configuration simply by pulling the panel 209 forward from the drawer-type opening within the main body 205.

It should be appreciated that in each of the embodiments discussed above, when one of the interface devices is not desired for a particular configuration, the module or panel on which the interface device is mounted can be moved to a position wherein it is in a stacked configuration with the main body or another panel or module of the computer to minimize the overall footprint of the computer. As used herein, a stacked configuration between two components refers to a configuration wherein the footprint of at least the smaller of the two components substantially overlaps with the footprint of the other component.

It should be further appreciated that in each of the embodiments discussed above, the panels and modules that carry the interface devices are mounted directly to the main body of the computer. However, it should be appreciated that the present invention is not limited in this respect, as a panel or module that carries an interface device may be indirectly mounted to the main body by being directly mounted to another panel or module carrying a different interface device.

Figure 53:
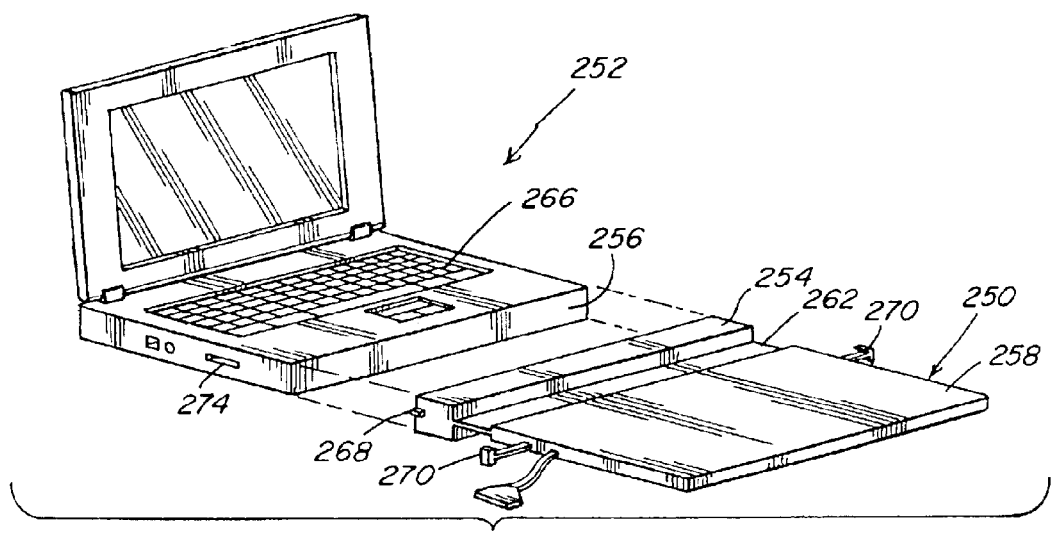
FIG. 53 is a perspective view of an alternate embodiment of the invention related to an add-on adapter unit for adding a keyless user interface to a notebook computer.
Figure 54:
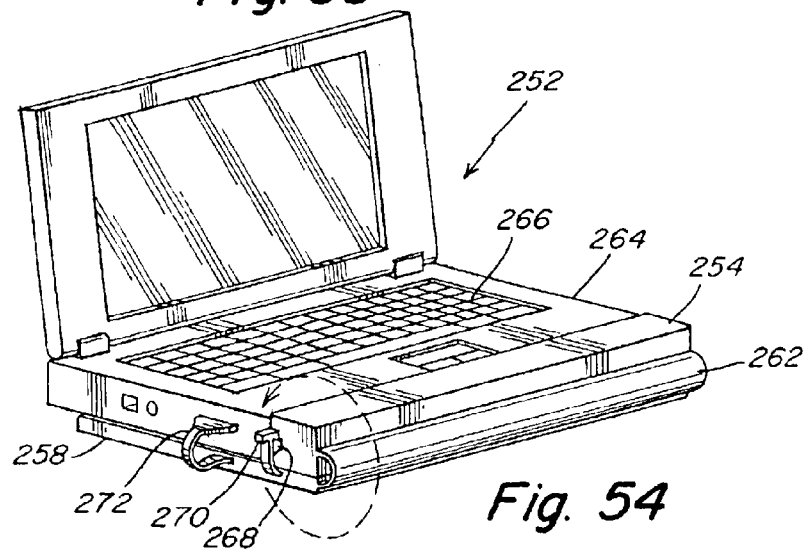
FIG. 54 is a perspective view of the add-on adapter unit of FIG. 53 mounted to a notebook computer but with the keyless user interface pivoted out of the way so that it is inaccessible to a user.
Figure 55:
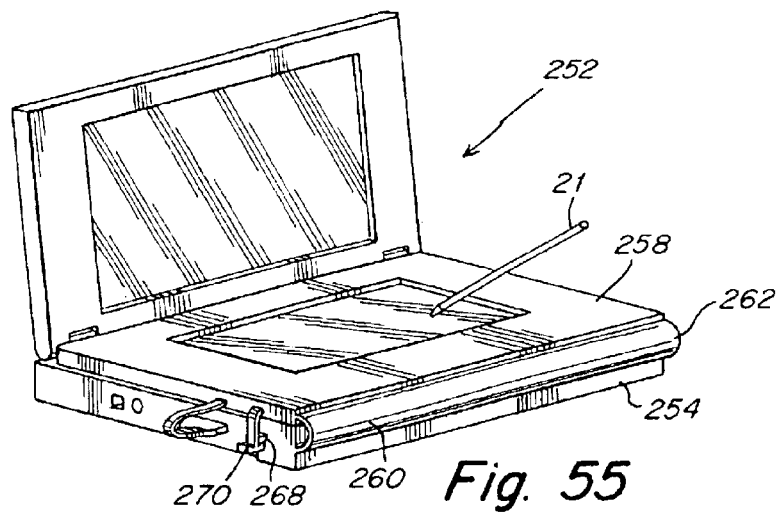
FIG. 55 is a perspective view of the add-on adapter unit of FIG. 53 mounted to a notebook computer with the keyless user interface disposed above the keyboard of the computer.

An alternate embodiment of the present invention is illustrated in FIGS. 53–55, and is directed to an add-on adapter unit 250 that can be attached to any conventional notebook computer, such as the notebook computer 252 shown in FIGS. 53–55, to enable the combined system to be reconfigured between an open notebook configuration as illustrated in FIG. 54 and an open dual-digitizer configuration as illustrated in FIG. 55. It should be appreciated that the adapter unit 250 provides a number of advantages over conventional peripheral digitizers, which may be electrically (but not mechanically) coupled to a conventional notebook computer. In this respect, a typical peripheral digitizer requires additional work space in addition to that taken up by the notebook computer, and will not fit within the footprint of the notebook computer. Conversely, the embodiment of the present invention directed to an add-on device that is mechanically coupled to a notebook computer can fit within the footprint of the notebook computer, so that it provides increased functionality in a compact configuration.

The adapter unit 250 includes an interface 254 that is adapted to mate, in a press-fit arrangement, with a front surface 256 of the notebook computer, so that the adapter unit 250 can be mechanically coupled thereto. However, it should be appreciated that the embodiment of the present invention relating to an add-on adapter unit is not limited to this or any other type of mechanical interface, as numerous other alternatives are possible. For example, the adapter can be attached to a side of the notebook computer, rather than to the front face 256, or can be attached in numerous other ways.

The adapter unit 250 further includes a panel 258 having a digitizer 260 disposed therein. The digitizer 260 can be of any type, including a digitizer that receives input from a stylus 21 as shown in FIG. 55. In addition, it should be appreciated that the embodiment of the invention directed to an add-on adapter unit is not limited to use with a digitizer, and can be employed with other types of keyless user interfaces.

The panel 258 is attached to the interface 254 via a living hinge 262, which is a flexible hinge that enables the panel 258 to be pivoted under a base 264 of the notebook computer 252, as shown in FIG. 54, and to be pivoted to overlie a keyboard 266 of the notebook computer as shown in FIG. 55. The adapter unit 250 further includes a locking assembly adapted to maintain the panel 258 in the desired position and to resist movement therefrom based upon any bias in the living hinge 262. In the specific implementation shown, the locking assembly includes a pair of tabs 268 on each end of the interface 254 (although only one of the tabs 268 is shown in the drawings), and a pair of mating two-sided hooks 270 that are adapted to mate therewith to hold the panel 258 either in the folded underneath position of FIG. 54 or in the position wherein the panel overlies the keyboard 266 as shown in FIG. 55. It should be appreciated that the present invention is not limited to employing this particular type of locking assembly to hold the panel 258 in place, as numerous other techniques are possible. In addition, it should be appreciated that the embodiment of the present invention directed to an add-on adapter unit is not limited to employing a living hinge 262, as numerous other arrangements are possible that would allow the panel 258 to achieve the desired range of movement to enable it to lie atop the keyboard 266 or be disposed under the body 264 of the notebook computer, including double hinge and arm arrangements as discussed above in connection with other embodiments of the present invention.

While not shown in the figures, the side of the panel 258 away from the digitizer 260 can be provided with feet to raise the surface of the panel above the keyboard 266 so as to not interfere with the keyboard when in the dual-digitizer configuration of FIG. 55.

Finally, the adapter unit 250 includes an electrical connector 272 that is capable of interfacing with a connector 274 provided on the notebook computer 252. The present invention is not limited to employing any particular type of connector 272, as any connector suitable for mating with a connector provided on a notebook computer can be employed.

As should be appreciated from the various embodiments discussed above, there are numerous ways of implementing a mechanical interface between various system components so that panels can be positioned either above or below another component (e.g., a main body unit) of the system. The examples of these mechanical interfaces discussed above include the double hinge arrangements, arm assemblies and a living hinge arrangement. It should be appreciated that any of these various mechanical interface can be substituted freely for each other in any of the embodiments of the invention discussed above, and further that numerous other types of arrangements are possible to achieve the desired configurability, such that the present invention is not limited to employing any particular types of mechanical interfaces.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A computer, comprising:

a body including a processor;

a display mechanically coupled to the body;

a module that is mountable to the body and includes an alphanumeric keyboard and a keyless user interface disposed on opposite sides thereof; and at least one electrical connector to electrically couple the keyboard and the keyless user interface to the processor, wherein the at least one electrical connector includes a cable-less interface between the module and the body;

wherein the body is adapted to receive the module in a first configuration wherein the keyboard is accessible to the user and the keyless user interface is inaccessible and in a second configuration wherein the keyless user interface is accessible to the user and the keyboard is inaccessible; and wherein the at least one electrical connector includes:
a first connector that is disposed on the body and is electrically coupled to the processor; and
a second connector that disposed on the module and is electrically coupled to the keyboard;
wherein the first and second connectors are configured to physically mate to form an electrical connection between the processor and the keyboard when the computer is in the first configuration and to be physically separated so as to not form an electrical connection between the processor and the keyboard when the computer is in the second configuration.

2. The computer of claim 1, wherein the at least one electrical connector further includes a third connector that is disposed on the module and is electrically coupled to the keyless user interface, wherein the first and third connectors are configured to physically mate to form an electrical connection between the processor and the keyless user interface when the computer is in the second configuration and to be physically separated so as to not form an electrical connection between the processor and the keyless user interface when the computer is in the first configuration.

3. A computer, comprising:

a body including a processor;

a display mechanically coupled to the body;

a module that is mountable to the body and includes an alphanumeric keyboard and a keyless user interface disposed on opposite sides thereof; and at least one electrical connector to electrically couple the keyboard and the keyless user interface to the processor, wherein the at least one electrical connector includes a cable-less interface between the module and the body;

wherein the body includes a slot to slidably receive the module, the slot having first and second ends, the second end being open so that the module can be slid partially out of the slot so that a portion of the module can extend beyond the second end; and wherein the computer further includes a door that is movably mounted to the body between open and closed positions, wherein in the open position the door closes the second end of the slot to prevent the module from being slid partially out of the slot, and wherein in the open position the door opens the second end of the slot so that the module can be slid partially out of the slot.

4. A computer, comprising:

a body including a processor;

a display mechanically coupled to the body; and a module that is slidably mountable to the body and includes an alphanumeric keyboard and a keyless user interface disposed on opposite sides thereof;

wherein the body includes a slot to slidably receive the module in a first configuration wherein the keyboard is accessible to the user and the keyless user interface is inaccessible and in a second configuration wherein the keyless user interface is accessible to the user and the keyboard is inaccessible, the slot having first and second ends, the second end being open so that the module can be slid partially out of the slot so that a portion of the module can extend beyond the second end when moving between the first and second configurations; and wherein the computer further includes a door that is movably mounted to the body between open and closed positions, wherein in the open position the door closes the second end of the slot to prevent the module from being slid partially out of the slot, and wherein in the open position the door opens the second end of the slot so that the module can be slid partially out of the slot.

* * * * *